United States Patent
Xia et al.

(10) Patent No.: US 12,206,737 B2
(45) Date of Patent: Jan. 21, 2025

(54) UNIVERSAL TRANSPORT FRAMEWORK FOR HETEROGENEOUS DATA STREAMS

(71) Applicant: Agora Lab, Inc., Santa Clara, CA (US)

(72) Inventors: Tian Xia, Shanghai (CN); Liu Yong, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 32 days.

(21) Appl. No.: 17/354,657

(22) Filed: Jun. 22, 2021

(65) Prior Publication Data

US 2022/0368765 A1 Nov. 17, 2022

Related U.S. Application Data

(63) Continuation of application No. 17/319,738, filed on May 13, 2021.

(51) Int. Cl.
*G06F 15/16* (2006.01)
*H04L 7/00* (2006.01)
*H04L 67/141* (2022.01)
*H04L 67/146* (2022.01)
*H04L 67/60* (2022.01)

(52) U.S. Cl.
CPC .......... *H04L 67/141* (2013.01); *H04L 7/0079* (2013.01); *H04L 7/0091* (2013.01); *H04L 67/146* (2013.01); *H04L 67/60* (2022.05)

(58) Field of Classification Search
CPC ... H04L 67/141; H04L 7/0079; H04L 7/0091; H04L 67/146; H04L 67/60
USPC ....................................................... 709/227
See application file for complete search history.

(56) References Cited

U.S. PATENT DOCUMENTS

| | | | |
|---|---|---|---|
| 6,014,694 A | 1/2000 | Aharoni et al. | |
| 6,831,893 B1 | 12/2004 | Ben Nun et al. | |
| 7,275,152 B2 | 9/2007 | Goud et al. | |
| 7,680,038 B1 | 3/2010 | Gourlay | |
| 8,223,788 B1 * | 7/2012 | Perelstain | H04L 49/9047 370/429 |
| 8,732,236 B2 | 5/2014 | Altmaier et al. | |
| 9,130,864 B2 | 9/2015 | Keith | |
| 9,804,886 B1 * | 10/2017 | Wells | G06F 9/5033 |
| 10,331,612 B1 * | 6/2019 | Petkov | G06F 13/4221 |

(Continued)

OTHER PUBLICATIONS

Extended European Search Report and Written Opinion for European Application No. 21185450.0 dated Jan. 7, 2022.

(Continued)

*Primary Examiner* — Thuong Nguyen
(74) *Attorney, Agent, or Firm* — Young Basile Hanlon & MacFarlane, P.C.

(57) ABSTRACT

An apparatus for communication between a sending application and a receiving application of a receiving apparatus includes a processor that is configured to establish a stream for transmitting data between the sending application and the receiving application; receive a first request from the sending application to transmit metadata to the receiving application; receive a second request from the sending application to transmit application data to the receiving application; responsive to a determination that a frame that includes the application data and the metadata has a size that is smaller than or equal to a maximum frame size, construct the frame to include the application data and the metadata; and transmit the frame in a packet to the receiving apparatus.

18 Claims, 9 Drawing Sheets

(56) References Cited

U.S. PATENT DOCUMENTS

| | | | |
|---|---|---|---|
| 10,374,900 B2* | 8/2019 | Dujodwala | H04L 41/12 |
| 10,862,940 B1* | 12/2020 | Jones | H04L 65/1059 |
| 11,244,405 B2 | 2/2022 | Bull et al. | |
| 2003/0023746 A1 | 1/2003 | Loguinov | |
| 2003/0133462 A1* | 7/2003 | Schoenblum | H04L 65/1101 |
| | | | 370/395.64 |
| 2003/0206549 A1 | 11/2003 | Mody et al. | |
| 2004/0153491 A1 | 8/2004 | Harada | |
| 2005/0223114 A1* | 10/2005 | Hanson | H04L 41/0893 |
| | | | 709/245 |
| 2006/0095944 A1* | 5/2006 | Demircin | H04N 19/166 |
| | | | 375/E7.181 |
| 2007/0076626 A1* | 4/2007 | Wise | H04L 47/283 |
| | | | 370/252 |
| 2007/0078978 A1 | 4/2007 | Arnold et al. | |
| 2007/0171829 A1* | 7/2007 | Kojima | H04L 69/161 |
| | | | 370/235 |
| 2007/0183423 A1 | 8/2007 | Passarella et al. | |
| 2007/0287477 A1* | 12/2007 | Tran | H04M 1/72427 |
| | | | 455/466 |
| 2008/0098124 A1 | 4/2008 | Vaughan et al. | |
| 2008/0259916 A1* | 10/2008 | Archer | H04L 45/243 |
| | | | 370/389 |
| 2009/0028142 A1 | 1/2009 | Schmidt et al. | |
| 2009/0083803 A1* | 3/2009 | Alshaykh | H04N 21/4402 |
| | | | 725/62 |
| 2009/0216796 A1* | 8/2009 | Slik | G06F 16/11 |
| 2010/0260180 A1 | 10/2010 | Wu et al. | |
| 2011/0038259 A1* | 2/2011 | Bharrat | H04L 47/2441 |
| | | | 370/230 |
| 2011/0310797 A1 | 12/2011 | Kobayashi et al. | |
| 2012/0207454 A1* | 8/2012 | Kim | H04N 21/4402 |
| | | | 375/E7.026 |
| 2014/0067994 A1* | 3/2014 | Puttaswamy Naga | |
| | | | G06Q 10/06313 |
| | | | 709/217 |
| 2014/0201318 A1 | 7/2014 | Dajani et al. | |
| 2014/0244598 A1* | 8/2014 | Haustein | G06F 16/2365 |
| | | | 707/692 |
| 2014/0254365 A1 | 9/2014 | Yanagisawa | |
| 2015/0143405 A1* | 5/2015 | Hogan | H04N 21/2187 |
| | | | 725/32 |
| 2015/0243257 A1* | 8/2015 | Witman | G06F 9/451 |
| | | | 345/522 |
| 2015/0271255 A1 | 9/2015 | Mackay et al. | |
| 2015/0365457 A1* | 12/2015 | Dvir | H04L 61/4541 |
| | | | 709/219 |
| 2016/0309364 A1* | 10/2016 | Maheshwari | H03M 7/30 |
| 2016/0344715 A1* | 11/2016 | Kumar | H04L 67/01 |
| 2016/0359974 A1* | 12/2016 | Miller | H04L 67/564 |
| 2017/0180440 A1 | 6/2017 | Schulz et al. | |
| 2017/0273100 A1 | 9/2017 | Huang et al. | |
| 2017/0303159 A1 | 10/2017 | Ma et al. | |
| 2017/0366416 A1 | 12/2017 | Beecham et al. | |
| 2017/0374130 A1* | 12/2017 | AbiEzzi | G06F 9/45533 |
| 2018/0262432 A1* | 9/2018 | Ozen | H04L 12/18 |
| 2019/0140967 A1* | 5/2019 | Deval | H04L 45/74 |
| 2019/0182020 A1* | 6/2019 | Patel | H04L 5/0055 |
| 2019/0253510 A1* | 8/2019 | Goodyear | H04L 63/104 |
| 2019/0280944 A1* | 9/2019 | Bellini | G06F 16/2379 |
| 2019/0340082 A1* | 11/2019 | Pradhan | G06F 11/1464 |
| 2020/0117415 A1 | 4/2020 | Lindblom | H04N 21/44008 |
| 2020/0322243 A1* | 10/2020 | Xi | H04L 47/2441 |
| 2021/0007172 A1* | 1/2021 | Lu | H04L 67/53 |
| 2021/0034571 A1 | 2/2021 | Bedadala et al. | |
| 2022/0158831 A1* | 5/2022 | Wing | H04L 63/10 |

OTHER PUBLICATIONS

Koshiba; QUIC Traffic Server Apache Software Foundation; https://cwiki.apache.org/confluence/display/TS/QUIC; pp. 1-4; Mar. 13, 2021.

Jia-Ru-Li et al; HPF: A Transport Protocol For Supporting Heterogeneous Packet Flows In the Internet; University of Ilinois at Urbana-Champaign; pp. 543-550; 1999 IEEE.

* cited by examiner

```
1  // create a stream factory with default or your own stream factory
2  StreamFactory stream_factory = DefaultStreamFactory();
3  // create a network implementation that AGT is going to overlay on
4  NetworkLayer network_layer = UdpNetworkLayerImpl();
5  // create a session builder to run
6  SessionBuilder session_builder = SessionBuilderFactory::Create(&stream_factory,
   &network_layer);
7  // set callback function when session is established
8  session_builder.OnSessionEstablished([this](Session session) {
9    // create a stream with type and metadata
10   Stream stream1 = session.CreateStream(
11     DefaultStreamFactory::ReliableStreamType, "this is my metadata"));
12   // send application stream data with certain priority
13   stream1.SendStreamData(HighestPriority, "application payload to send");
14   // set callback when application data received
15   stream1.OnReceivedStreamData([this](const std::string &payload_from_remote) {
16     // do application logic here
17   });
18
19   // create another stream with type and metadata
20   Stream stream2 = session.CreateStream(
21     DefaultStreamFactory::UnreliableStreamType, "this is my metadata"));
22   // send application stream data with certain priority
23   stream2.SendStreamData(LowestPriority, "application payload to send");
24   // set callback when application data received
25   stream2.OnReceivedStreamData([this](const std::string &payload_from_remote) {
26     // do application logic here
27   });
28 });
29
30 // if you are a client, start connect to a remote address
31 session_builder.Connect("127.0.0.1:12345");
32 // if you are a server, do nothing, just wait for client to connect
```

FIG. 13

UNIVERSAL TRANSPORT FRAMEWORK FOR HETEROGENEOUS DATA STREAMS

CROSS-REFERENCE TO RELATED APPLICATION(S)

This application is a continuation of U.S. patent application Ser. No. 17/319,738 filed May 13, 2021, the content of which is incorporated herein by reference in its entirety.

TECHNICAL FIELD

This disclosure relates to network communications, and in particular, to a universal transport framework for heterogeneous data streams.

BACKGROUND

In network communications, a transport layer can be used to provide services to an application layer. Depending on the network protocol used, the services can include connection-oriented communication, reliability of transmission, congestion avoidance, error correction, flow control, and other services. The application layer may have different transport layer requirements due to various application scenarios, such as reliable transmission for control commands, unreliable transmission for media flow, and so on. A typical solution is to use an available, existing protocol or to design a specific protocol to meet a specific scenario. Consequently, a complex system for various application scenarios usually must use more than one protocol to satisfy the complete set of communication requirements resulting in complex system architectures and network management.

SUMMARY

Disclosed herein are implementations of methods, apparatuses, and systems for universal transport framework for heterogeneous data stream transmission.

A first aspect is an apparatus for communication between a sending application and a receiving application of a receiving apparatus. The apparatus includes a processor that is configured to establish a stream for transmitting data between the sending application and the receiving application; receive a first request from the sending application to transmit metadata to the receiving application; receive a second request from the sending application to transmit application data to the receiving application; responsive to a determination that a frame that includes the application data and the metadata has a size that is smaller than or equal to a maximum frame size, construct the frame to include the application data and the metadata; and transmit the frame in a packet to the receiving apparatus.

A second aspect is a method for communication between a sending application and a receiving application of a receiving apparatus. The method includes establishing a stream for transmitting data between the sending application and the receiving application; receiving a first request from the sending application to transmit metadata to the receiving application; receiving a second request from the sending application to transmit application data to the receiving application; responsive to a determination that a frame that includes the application data and the metadata has a size that is smaller than or equal to a maximum frame size, constructing the frame to include the application data and the metadata; and transmitting the frame in a packet to the receiving apparatus.

A third aspect is a non-transitory computer-readable storage medium that includes executable instructions that, when executed by a processor, perform operations of a transport framework for communication between a sending application and a receiving application of a receiving apparatus. The operations include establishing a stream for transmitting data between the sending application and the receiving application; receiving a first request from the sending application to transmit metadata to the receiving application; receiving a second request from the sending application to transmit application data to the receiving application; responsive to a determination that a frame that includes the application data and the metadata has a size that is smaller than or equal to a maximum frame size, constructing the frame to include the application data and the metadata; and transmitting the frame in a packet to the receiving apparatus.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 13 is an example of a program listing of using a universal transport framework for heterogeneous data streams.

DETAILED DESCRIPTION

Figure 1:
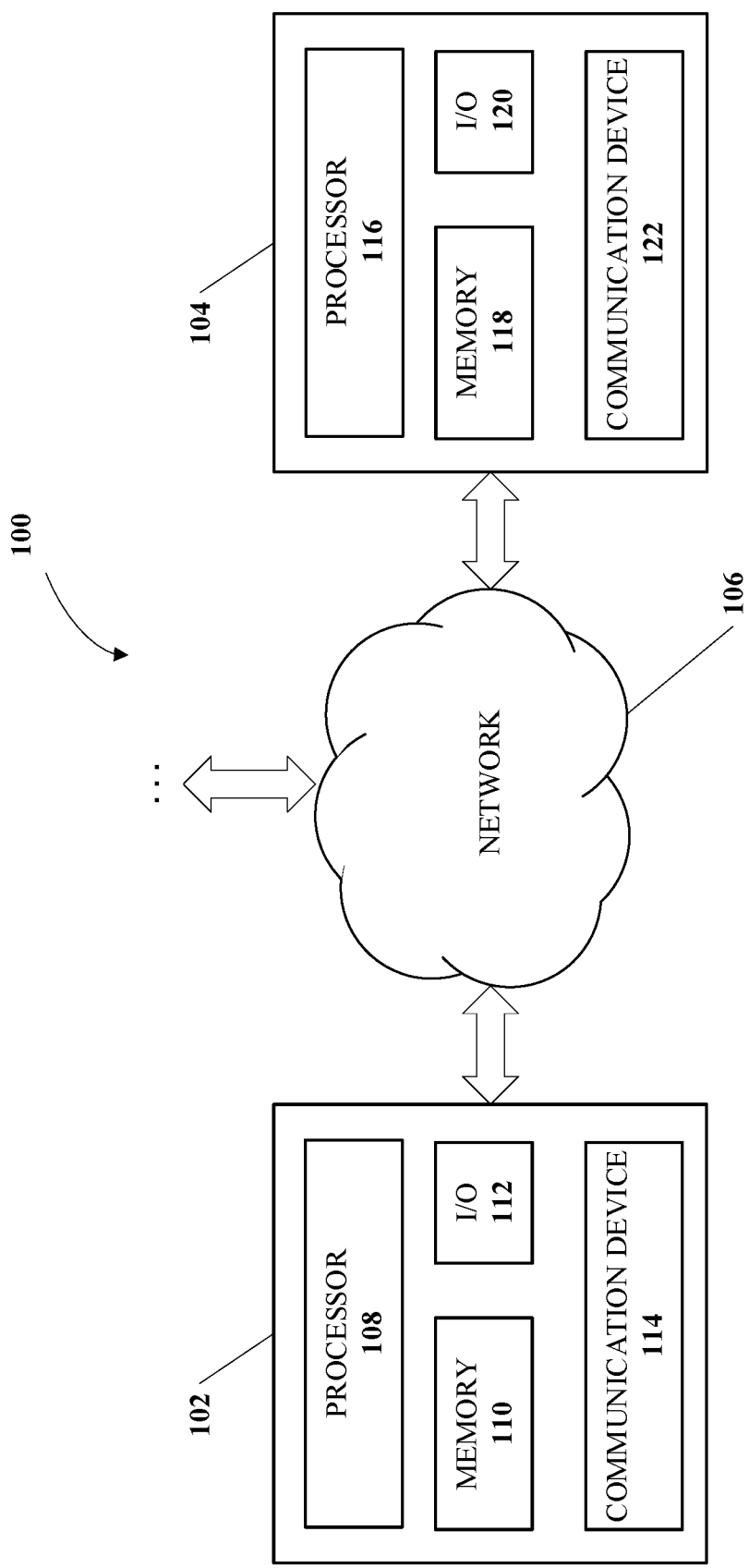
FIG. 1 is a diagram of an example of an environment where a universal transport framework for heterogeneous data streams can be used.

Several models for communications over a network have been described and/or implemented. Two such models are the Open Systems Interconnection (OSI) and the Transmission Control Protocol/Internet Protocol (TCP/IP) model. Other models are also available. Detailed descriptions of these or other models are not necessary for the understanding of the universal transport framework for heterogeneous data streams described herein. However, high level descriptions of these models are provided for context.

The OSI model is a well-known seven-layer reference model that describes functions via which systems or applications therein can communication over a network. The model includes a physical layer, a data link layer, a network layer, a transport layer, a session layer, a presentation layer, and an application layer. The physical layer is the lowest layer and represents the electrical or physical interface that connects a device to a transmission medium. The data link layer receives raw data from the physical layer and packages them into frames. The network layer is responsible for organizing data into packets and transmitting the packets between multiple networks. The transport layer handles end to end transport for applications. The session layer is a software-level layer that manages communication sessions between devices. The presentation layer manages data formatting and presentation, such as by converting data formats between applications. The application layer permits communication between applications.

TCP/IP is also a model for end-to-end communications between devices over a network. The TCP/IP model includes a link layer, an internet layer, a transport layer, and an application layer. The link layer may be thought of as providing services similar to those of the combination of the physical layer and data link layer of the OSI model. The internet layer may be thought of as providing services similar to those of the network layer of the OSI model. The transport layer may be thought of as providing services similar to those of the transport layer of the OSI model. The application layer may be thought of as providing services similar to those of the combination of the session layer, the presentation layer, and the application layer of the OSI model.

The transport layer in either model (or in other models) can implement mechanisms for error control, network congestion control, data retransmission (such as of lost data), acknowledgement of received data, data deduplication (such as by discarding duplicate received data) and so on. The transport layer can provide data channels for the communication needs of applications.

The application communication needs (e.g., quality of service) can vary from task to task or by data type. Data types can include, without limitations, files, e-mails, Web contents, real-time audio/video data streams, control commands, and so on. For example, in a real-time communications (RTC) session, a user may transmit a text message or transfer a file to another user. For example, communicating users in the RTC session may be able to see (e.g., via video data) and hear (e.g., via audio data) each other. As such, the RTC session can include the transfer of data types (the text message and file) that must be received in their entirely without loss; data types that can tolerate loss; and data types that may be of higher priority than other data types. If a part of the text message or a part of the file are lost (i.e., are not received by the receiver), then the receiver may not able to reconstitute or view the data. On the other hand, video and audio decoding can be tolerant to loss. Furthermore, audio data may be transferred at a higher priority than video data.

The transport layer may provide transport layer protocols suitable for the different data types or application needs. For example, the Transmission Control Protocol (TCP) and the User Datagram Protocol (UDP) protocols may be available. The TCP protocol may be used where reliable, ordered, and error-checked data transport (e.g., delivery) is desirable; and the UDP protocol may be used where guarantees of delivery, ordering, or duplicate protection are not necessary. For example, for transfer of files, e-mails, Web contents, control commands, and the like, the TCP may be suitable due to its reliability. On the other hand, for transfer of real-time audio/video data streams, which is time-sensitive, the UDP may be used. Other protocols may be available, such as one or more of the AppleTalk Transaction Protocol (ATP), Datagram the Congestion Control Protocol (DCCP), the Fibre Channel Protocol (FCP), the Stream Control Transmission Protocol (SCTP), the Structured Stream Transport (SST), an application-specific custom protocol, to name a few.

To accommodate the different communication needs or tasks of an application (e.g., the application layer of a communication model), an application developer may have to choose from one or more of the available protocols and/or design a specific protocol to meet specific application use cases or tasks. An application may use more than one protocol to satisfy the complete set of communication requirements.

Having to work with multiple protocols simultaneously can complicate application development and can result in a complex system (e.g., application) architecture and complex network management. The application may not be able to achieve an optimal overall transmission efficiency in the specific network scenarios because of the disparate realization principles between different protocols, such as under the competition and confliction condition between TCP and UDP, as a person skilled in the art recognizes.

The Universal Transport Framework (UTF) for heterogeneous data streams as described herein, which can meet various transmission requirements (such as reliable and unreliable stream transmission) can overcome the problem described above. The various transmission requirements can be satisfied via flexible configurations and adaptive methods, as further described herein. The UTF defines a protocol that can be used to transfer both reliable and unreliable data. The UTF can manage retransmission of lost, or potentially lost, data even when the underlying protocol used is an unreliable protocol, such as the UDP.

As further described herein, the UTF can be a hierarchical protocol that includes two layers: a session layer and a connection layer. The session layer can manage all application streams and can encapsulate stream payloads into stream frames. The session layer provides interfaces for the abstract (e.g., transparent, etc.) management of reliable transport streams and unreliable transport streams. The session layer can also manage frame retransmission. The connection layer can handle (e.g., manage, determine, etc.) network conditions. The connection layer can notify the session layer of lost (or likely lost) frames. The session layer can in turn notify the application layer of the lost frames.

The UTF can be used to transmit multiple streams with different requirements (such as different reliability, priority requirements, or other requirements). The UTF can provide a hierarchical model that separates transmission control from reliability management therewith providing a universal transmission protocol that can multiplex multiple streams to meet the heterogeneous application stream requirements. Applications (e.g., application developers) can use the UTF via Application Programming Interfaces (APIs). For example, different streams can be created by calling (e.g., invoking, etc.) the APIs. For example, one API can be used for creating a reliable stream. For example, another API can be used for creating an unreliable stream. In an example, an unreliable stream can be used in real-time applications (e.g., transport, etc.), such as in the case of video, audio, or instant message communications. In an example, and to satisfy real-time transport requirements, an unreliable stream can implement (e.g., employ, support, use, etc.) one or more techniques or strategies to reduce latency, such as forward error correction, retransmission of lost packets for a predetermined times, or a predetermined timeout of retransmission for lost packets. An unreliable stream that is configured to satisfy real-time transport requirements is referred to herein as a partially reliable stream. Other APIs can be used to transmit or receive data using the created streams.

By using the UTF described herein, applications do not need to, for streams they create and/or for payloads that are transmitted using the streams, for example, manage congestion control, such as by having to determine when to send packets so as not to congest the network; and need not manage packet loss or potential packet loss.

As further described below, the UTF uses novel techniques and structures for acknowledging receipt, by a receiver, of data packets and frames; for acknowledging, at the sender, the acknowledgment of the receiver; for transmission and acknowledgment of metadata; and for congestion control. These techniques and structures can simplify application development and reduce network traffic, and hence, reduce investment in processing, memory, storage resources, or network bandwidth resulting in reduced emissions associated with the reductions.

FIG. 1 is a diagram of an example of an environment 100 where a universal transport framework for heterogeneous data streams can be used. In FIG. 1, the environment 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider (e.g., a web host or a cloud service provider).

In some implementations, the computing device can be implemented in the form of multiple groups of computers that are at different geographic locations and can communicate with one another, such as by way of a network. While certain operations can be shared by multiple computers, in some implementations, different computers can be assigned to different operations. In some implementations, the environment 100 can be implemented using general-purpose computers with a computer program that, when executed, performs any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can include a processor 108 and a memory 110. The processor 108 can be any type of device or devices capable of manipulating or processing data. The terms "signal," "data," and "information" are used interchangeably. The processor 108 can include any number of any combination of a central processor (e.g., a central processing unit or CPU), a graphics processor (e.g., a graphics processing unit or GPU), an intellectual property (IP) core, an application-specific integrated circuits (ASIC), a programmable logic array (e.g., a field-programmable gate array or FPGA), an optical processor, a programmable logic controller, a microcontroller, a microprocessor, a digital signal processor, or any other suitable circuit. The processor 108 can also be distributed across multiple machines (e.g., each machine or device having one or more processors) that can be coupled directly or connected via a network.

The memory 110 can be any transitory or non-transitory device capable of storing instructions and data that can be accessed by the processor (e.g., via a bus). The memory 110 herein can include any number of any combination of a random-access memory (RAM), a read-only memory (ROM), a firmware, an optical disc, a magnetic disk, a hard drive, a solid-state drive, a flash drive, a security digital (SD) card, a memory stick, a compact flash (CF) card, or any suitable type of storage device. The memory 110 can also be distributed across multiple machines, such as a network-based memory or a cloud-based memory. The memory 110 can include data, an operating system, and one or more applications. The data can include any data for processing (e.g., an audio stream, a video stream, or a multimedia stream). An application can include instructions executable by the processor 108 to generate control signals for performing functions of the methods or processes disclosed herein.

In some implementations, the apparatus 102 can further include a secondary storage device (e.g., an external storage device). The secondary storage device can provide additional memory when high processing needs exist. The secondary storage device can be any suitable non-transitory computer-readable medium, such as a ROM, an optical disc, a magnetic disk, a hard drive, a solid-state drive, a flash drive, a security digital (SD) card, a memory stick, or a compact flash (CF) card. Further, the secondary storage device can be a component of the apparatus 102 or can be a shared device accessible by multiple apparatuses via a network. In some implementations, the application in the memory 110 can be stored in whole or in part in the secondary storage device and loaded into the memory 110 as needed for processing.

The apparatus 102 can further include an input/output (I/O) device (i.e., I/O device 112). The I/O device 112 can also be any type of input devices, such as a keyboard, a numerical keypad, a mouse, a trackball, a microphone, a touch-sensitive device (e.g., a touchscreen), a sensor, or a gesture-sensitive input device. The I/O device 112 can be any output device capable of transmitting a visual, acoustic, or tactile signal to a user, such as a display, a touch-sensitive device (e.g., a touchscreen), a speaker, an earphone, a light-emitting diode (LED) indicator, or a vibration motor. For example, the I/O device 112 can be a display to display a rendering of graphics data, such as a liquid crystal display (LCD), a cathode-ray tube (CRT), an LED display, or an organic light-emitting diode (OLED) display. In some cases, an output device can also function as an input device, such as a touchscreen.

The apparatus 102 can further include a communication device 114 to communicate with another apparatus via a network 106. The network 106 can be any type of communications networks in any combination, such as a wireless network or a wired network. The wireless network can include, for example, a Wi-Fi network, a Bluetooth network, an infrared network, a near-field communications (NFC) network, or a cellular data network. The wired network can include, for example, an Ethernet network. The network 106 can be a local area network (LAN), a wide area networks (WAN), a virtual private network (VPN), or the Internet. The network 106 can include multiple server computers (or "servers" for simplicity). The servers can interconnect with each other. One or more of the servers can also connect to end-user apparatuses, such as the apparatus 102 and the apparatus 104. The communication device 114 can include any number of any combination of device for sending and receiving data, such as a transponder/transceiver device, a modem, a router, a gateway, a wired network adapter, a wireless network adapter, a Bluetooth adapter, an infrared adapter, an NFC adapter, or a cellular antenna.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can include (e.g., implement, execute, etc.) a sending application that sends data to the apparatus 104, and the apparatus 104 can include a receiving application for receiving the data sent by the apparatus 102, or vice versa. As such, the apparatus 102 and the apparatus 104 can simultaneously be a sender and a receiver. The apparatus 102 can communicate with the apparatus 104 via the network 106. The apparatus 102 and the apparatus 104 can also communicate with other apparatuses (not shown) connected to the network 106. The apparatus 102 can include (or, equivalently, the sending application can use) and the apparatus 104 can include (or, equivalently, the receiving application can use) the UTF for communicating via the network. It should be noted that similar portions of the apparatus 102 and the apparatus 104 do not necessarily have to be implemented in the same manner.

It should also be noted that parts or components of the apparatus 102 and the apparatus 104 and the environment 100 can include elements not limited to those shown in FIG. 1. Without departing from the scope of this disclosure, the apparatus 102 and the apparatus 104 and the environment 100 can include more or fewer parts, components, and hardware or software modules for performing various functions in addition or related to network communication using the UTF.

Figure 2:
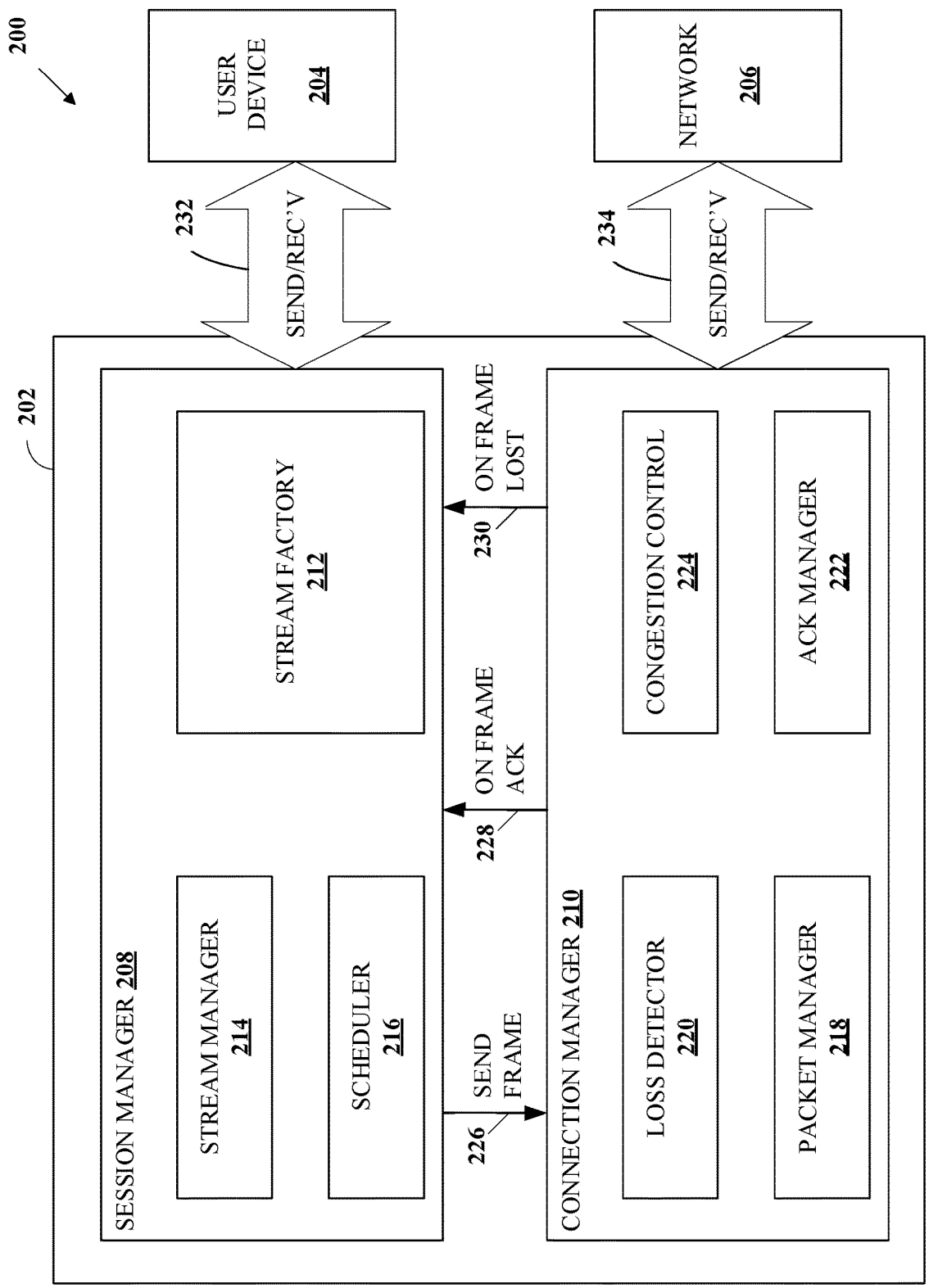
FIG. 2 is a diagram of an example of a system 200 for describing a universal transport framework for heterogeneous data streams.

FIG. 2 is a diagram of an example of a system 200 for describing a universal transport framework for heterogeneous data streams. The system 200 includes a user device 204 and a network 206. The user device (e.g., an application therein), which is also referred to herein as the sender, can transmit data, such as to another user device (not shown) via the network 206 using a UTF 202. The other device is referred to herein as the receiver. The user device 204 (i.e., the sender) can be the apparatus 102 or the apparatus 104 of FIG. 1 and the receiver can be the other of the apparatus 102 or the apparatus 104. The network 206 can be the network 106 of FIG. 1. The sender (e.g. the user device 204) can also be a receiver of data. As such, the user device 204 can simultaneously be a sender and a receiver.

The UTF 202 can be included in the user device 204. For example, the UTF 202 can be a module of the user device 204. A server of the network 206 can also include a UTF 202 module. It is noted that the receiver can also include its own UTF 202 and the same numerals are used to refer to the modules of the UTF 202 of the receiver. The UTF 202 can be implemented, for example, as a software program (e.g., a software module, a library, or the like) that may be executed by computing devices such as the user device 204 or the apparatus 102 or the apparatus 104 of FIG. 1. The software program can include machine-readable instructions that may be stored in a memory, such as the memory 110, and that, when executed by a processor, such as the processor 108 of FIG. 1, may cause the computing device to perform the operations described herein. The UTF 202 can be implemented using specialized hardware or firmware. Multiple processors, memories, or both, may be used.

The UTF 202 can include a session management module 208 and a connection management module 210. The session management module 208 can include a stream factory 212, a stream manager module 214, and a scheduler module 216. The connection management module 210 can include a loss detection module 220, a packet manager module 218, a congestion control manager 224, and an acknowledgment manager module 222. In some implementations, additional modules can be added, certain modules can be combined, and/or certain modules can be removed.

The session management module 208 can be used to manage streams. Applications can use APIs of the session management module 208 to create (and destroy) and manage streams. A stream can be defined as a sequence of data elements that an application (such as an application executing on the user device 204) sends/receives (such as over time) via the network 206 to/from another application executing on another computing device. Streams can represent (e.g., implement, be used for, etc.) reliable or unreliable transport. Retransmission control is encapsulated in each stream itself (or more accurately, in the stream management itself).

The session management module 208 can encapsulate stream payloads (e.g., the data to be sent) into stream frames. A stream frame can be a data container that has a defined (e.g., deterministic, known, predictable, etc.) structure and semantics such that a receiver can unambiguously parse (e.g., consume, read, etc.) the contents of a received stream frame. Frames, other than stream frames, are also possible as described herein.

An client application can establish a connection between a client device executing the client application and another device (such as a server or another client device). After establishing the connection, APIs of the stream factory 212 can be used by the client application to create one or more streams. Creating a stream can include assigning a priority to the stream. Metadata (also referred to herein as customized metadata, application metadata, or stream metadata) can be associated with the stream. The metadata can be associated with the stream at the time of creating the stream or before application data is send using the stream. Creating the stream can include specifying the customized metadata. In an example, the metadata can be immutable. That is, the stream metadata that are sent to the receiver are not later changed while the stream is open during the connection between the sender and the receiver.

To illustrate, and without loss of generality, in a multi-media communication system, three streams may be created. A signaling channel may be used to communicate via a reliable stream with the highest priority. An audio or a video stream may use unreliable streams. The audio stream can have a higher priority than the video stream. Customized metadata, which may be transmitted over the signaling channel, can carry the descriptions of the audio or the video streams. For example the metadata can include the standard (e.g. H.264, H.265, AV1, etc.) according to which the video data is encoded before transmission using the video stream. Without such metadata, the video data may not be correctly decoded by the receiver. In another example, the metadata may be included in packets of the audio or the video streams.

The stream manager module 214 can maintain, for each frame of a stream that is sent, a respective record associated with the stream. The respective record can include a current status of the frame. The current status can indicate whether the frame was successfully transmitted or was lost, as further descried below.

The scheduler module 216 prioritizes frames for transmission. The scheduler module 216 can prioritize frames using customized configurations. The scheduler module 216 can deliver the frames, according to the frame priorities, to the underlying connection management module 210, as indicated by an arrow 226. For example, and as already mentioned, audio frames may be transferred before video frames because the audio stream may have been created with a higher priority than the video stream. Audio frames can be more efficiently transferred than video frames, which may require significantly more (e.g., 10x or 20x) bandwidth to transfer than audio data. As such, under degraded or low-bandwidth network conditions, by prioritizing the transfer of audio frames, the sending user can be practically immediately heard by the receiving user even if the sending user couldn't be immediately seen (using video data).

The scheduler module 216 can determine the priorities of frames based on the configured priorities of the corresponding streams. The scheduler module 216 delivers (e.g., provides, handoff, transfer, etc.) frames to be transferred to the connection management module 210, as indicated by the arrow 226, which indicates a request to the connection management module 210 to send the frames over the network 206. The scheduler module 216 can schedule when to send a respective next frame. The scheduler module 216 can prioritize the stream frames before delivering them to the connection management module 210.

In an example, the scheduler module 216 can use the max-min fairness strategy to schedule the stream frames according to each stream's priority. In another example, the scheduler module 216 may use different strategies to schedule the stream frames using the statistics collected by the packet manager module 218, the congestion control manager 224, other statistics, or a combination thereof. As such, optimal overall transmission can be achieved.

The connection management module 210 can encapsulate frames (such as stream frames or other frames) into connection packets and transmit the packets out using an underlying protocol. That is, the connection management module 210 can assemble multiple stream frames into one packet for transmission over the network. The underlying protocol can be an unreliable protocol (e.g., the UDP), a reliable protocol (e.g., the TCP), or some other protocol. When the underlying protocol is the unreliable protocol (e.g., the UDP), retransmission control can be performed by the UTF 202. When the underlying protocol is the reliable protocol (e.g., the TCP), retransmission may be handled by the reliable protocol itself and the UTF 202 may not be able to control retransmission.

The packet manager module 218 can serialize packets (for sending to the receiver) and deserialize packets (received from the sender). As described with respect to FIGS. 3-5, a packet can have a predefined format (e.g., structure) that describes what is contained in the packet. For example, a packet can include stream frames, acknowledgment frames (or simply, ACK frames), some other frames, or a combination thereof.

The packet manager module 218 can manage a caching strategy. The packet manager module 218 can cache packets sent to the network 206. The packet manager module 218 can maintain a record of packets that the connection management module 210 sends (e.g., transmits over the network 206). When an acknowledgement for a packet is received from the receiver, the packet manager module 218 can update the record corresponding to the acknowledged packet. When a packet is acknowledged, the packet can be removed from the cache. If a packet is not acknowledged, the connection management module 210 can notify the session management module 208 that the frames included in the packet are lost. The session management module 208 can mark the frames as lost. In an example, the session management module 208 can notify the stream (or, equivalently, the application) of the frames that the frames are lost.

As further described herein, a packet can include zero or more stream frames and zero or more acknowledgment frames. As acknowledgments are at the packet level, when an acknowledgment is received, the cache can be used to determine, for example, which stream frames were acknowledged and/or which acknowledgement frames were received by the receiver. Responsive to receiving an acknowledgment, the connection management module 210 can notify the session management module 208 of the acknowledgement, as indicated by an arrow 228. Notifying the session management module 208 of the acknowledgement of a packet can mean notifying the session management module 208 of the acknowledgment of the stream frames encapsulated (e.g., included, etc.) in the packet. Responsive to the notification, the stream manager module 214 can update the record for the stream frames to indicate that the frames were successfully transmitted.

The loss detection module 220 can detect lost packets. Each packet that is transmitted includes a packet number. The acknowledgement can include the packet number that is received at the receiver. That the acknowledgement includes the packet number can mean that the acknowledgement includes a range that includes the packet number, as further described with respect to FIG. 8. In some situations, the loss detection module 220 may determine that an unacknowledged packet is a lost packet (i.e., never received at the receiver). A packet may be determined to be lost based on the acknowledged packets. For example, if packets having packet numbers 10, 11, 12, and 13 were sent but only packets in the range 11-13 were acknowledged, then the loss detection module 220 may determine that packet numbered 10 was lost (i.e., not received at the receiver).

In an example, the unacknowledged packet may be retransmitted. Responsive to the loss detection module 220 detecting a lost packet, the loss detection module 220 notifies the stream manager module 214 of the stream frames encapsulated in the lost packet, as indicated by an arrow 230. The cache described with respect to the packet manager module 218 can be used to determine which stream frames are included in the lost packet. In an example, the stream manager module 214 can in turn notify the stream (or, equivalently, the application) of the lost frames.

In an example, the stream manager module 214 can determine further processing of the lost frames according to the stream type, customized requirements, other criteria, or a combination thereof. For example, if a lost stream frame belongs to a reliable stream, the stream manager module 214 may continue retransmitting the stream frame until the stream frame is successfully received (i.e., is acknowledged). For example, if a lost stream frame belongs to an unreliable stream, the stream manager module 214 may discard the stream frame. In another example, the stream manager module 214 can retransmit the lost stream frame that belongs to the unreliable stream for a predetermined limited number of times, such as according to stream configuration settings or UTF configuration settings. In another example, an API may be available for providing (such as by an application developer) instructions (such as in the form of a call back function) to the stream manager module 214 for custom, application-specific handling of lost frames. In another example, retransmission decisions are not made by the stream manager module 214. Rather, the stream manager module 214 can notify the stream of lost frames and the application that uses the stream can determine whether to retransmit a lost frame or not based on the application needs.

In some situations, a packet may be received by the receiver but the acknowledgment itself may be lost. Following the logic described above, the loss detection module 220 may incorrectly infer that the packet itself was lost. Thus, the loss of an acknowledgment may cause incorrect loss detection, which in turn may cause unnecessary retransmission. To prevent incorrect loss detection, a more efficient acknowledgement mechanism is described below with respect to FIG. 8.

For each packet that is sent to a receiver (i.e., the receiver of the stream content), the packet manager module 218 can maintain a respective record that includes the time that the packet was sent and the status of the packet. The status can be one of an inflight-status (i.e., that the packet has been sent but not yet acknowledged by the receiver), an acknowledged-status (i.e., that the packet that has been acknowledged by the receiver), a lost-status (i.e., that the packet is considered lost by the loss detection module 220), a spurious-lost-status (i.e., that the packet was considered lost but has now been actually acknowledged by the receiver), fewer statuses, more statuses, other statuses, or a combination thereof. At the connection management module 210 of the receiver, when packets are received from the underlying network protocol, the packets can be first processed in the connection management module 210 of the receiver. The packet number of the received packet can be included in an acknowledgement frame that is generated by the acknowledgment manager module 222 of the receiver. The acknowledgment frame can be sent back to the sender. In an example, the receiver can determine when to transmit acknowledgment frames depending on network conditions. As such, the transmission of acknowledgment frames can be adjusted dynamically.

The connection management module 210 of the receiver extracts stream frames from received packets and delivers the extracted packets to the session management module 208 of the receiver. The stream manager module 214 of the receiver can remove application payloads from the stream frames. The stream manager module 214 of the receiver can immediately provide the application payloads to the application layer of the in the case of a reliable stream. The stream manager module 214 of the receiver can cache the application payloads for reordering in the case of a reliable stream.

The congestion control manager 224 can determine when packets are to be transmitted to achieve congestion avoidance of the network 206. Congestion can result when the transmission rate may be higher than the bandwidth of the network. In an example, repeated retransmissions of unacknowledged packets may cause network congestion. The congestion control manager 224 can collect or compute network statistics (e.g., packet-level statistics) to calculate the estimated bandwidth and to control when packets are to be transmitted. The packet-level statistics can include one or more of a round-trip time, a one-way delay and jitter, a delay gradient, a loss ratio, a lost packets range distribution, an estimated available bandwidth, other statistics, or a combination thereof. The congestion control manager 224 can set (e.g., update, determine, calculate, set, select, etc.) congestion control parameters based on the statistics. The congestion control parameters can include one or more of a congestion window, a pacing rate, other parameters, or a combination thereof.

As such, in an example, the connection management module 210 can use the congestion control manager 224 (e.g., data received, collected, aggregated, etc. by the congestion control manager 224) to determine a time for sending a packet. The loss detection module 220 can be used to determine when an inflight packet is lost. The loss detection module 220 can provide loss information to the session management module 208. The session management module 208 can in turn notify the sending streams of the loss. A sending stream (or the application using the stream) can then determine (such as based on the specific application needs) whether the data is to be retransmitted.

Figure 3:
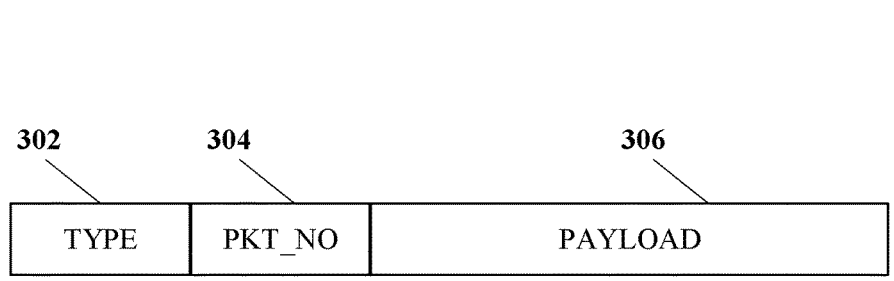
FIG. 3 is a diagram of an example of a structure of a packet.

FIG. 3 is a diagram of an example of a structure 300 of a packet. Other packet structures of a UTF are also possible. A packet may be transmitted by a sender, such as by the connection management module 210 FIG. 2 of a sender to a receiver over the network 206. A packet may be received by a receiver, such as by the connection management module 210 of FIG. 2 of a receiver from a sender over the network 206. Packets cannot contain data beyond a maximum packet size. Said another way, packets have a maximum packet size (such as in bytes). It is noted that a packet can include frames from multiple streams.

A field 302 can be used to indicate a type of the packet. In an example, the field 302 can have a first value or a second value. The first value can indicate that the packet is an initial packet that is transmitted when a connection is established and before any application data is transmitted. The second value can indicate that the packet is a data packet. The first value and the second value can the constant values kInitial and kData, as described respectively with respect to FIGS. 4-5.

A field 304 indicates a sequence number of the packet. Each sent packet of a stream can have (e.g., be assigned, such as by the packet manager module 218 of the sender) a unique number. The packet numbers are continuously increased. A field 306 indicates the payload to be included in the packet.

Figure 4:
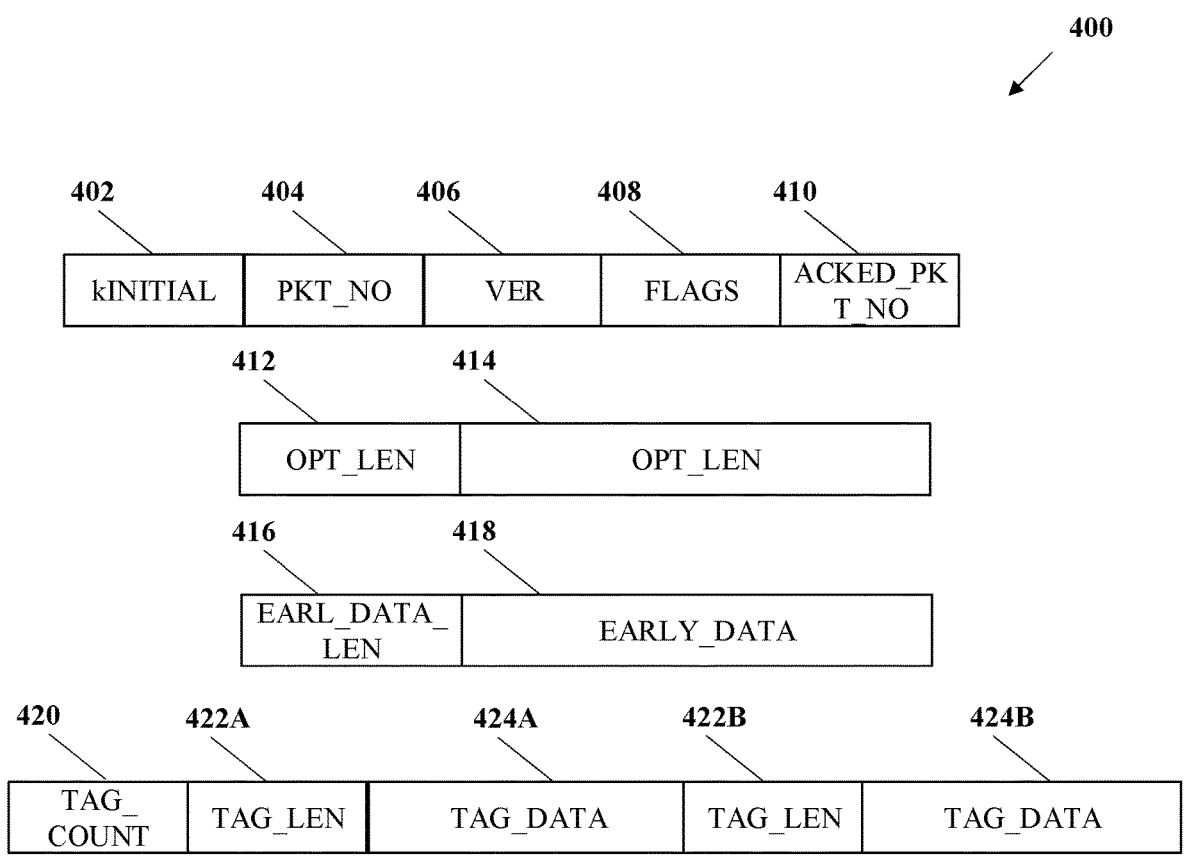
FIG. 4 is a diagram of an example of a structure of an initial packet.

FIG. 4 is a diagram of an example of a structure 400 of an initial packet. Other initial packet structures of a UTF are also possible. The structure 400 further describes the structure of a packet according to FIG. 3 where the type is kInitial. An initial packet can be used in initializing the connection. As further mentioned below, the handshake to establish the connection can be similar to the three-way handshake of TCP, which can complete in one round-trip time (RTT).

A field 402 indicates that the value of the packet type is kInitial. A field 404 can be the same as the field 304 of FIG. 3. The field 306 of FIG. 3 is further elaborated into fields 406-430. The field 406 can indicate the version of the UTF protocol used for generating the packet. The version can be used, for example, by a receiver to determine the structure (e.g., the contents) and the semantics of the packet. The version can be used, for example, for backward compatibility.

A field 408 includes a set of control bits (s, a, r, o, e, t) that each can have a 0 or 1 Boolean value. The control bits s, a, and r correspond to the three-way handshake between two TCP stacks. The control bits s, a, and r can be used when the underlying protocol used by the UTF is the TCP protocol. The control bits s, a, and r correspond, respectively, to the values SYN (synchronize sequence numbers), ACK (acknowledgment), and RST (reset the connection) of the three-way TCP handshake.

The control bit o indicates whether an "option" field is present later in the payload of the packet. The UTF can use the "option" field. That is, the "option" field can include UTF-specific, but not application-specific, data. To illustrate, the UTF can use the "option" field to transmit configuration information of a session. The control bit e indicates whether an "early_data" field is present later in the payload of the packet. In an example, early data can be used by an application to send some application data in a first round-trip of handshake without having to wait for the handshake to finish (i.e., before the handshake is completed). Other uses of "early_data" are possible. The control bit t indicates whether tags are present later in the payload of the packet. In an example, the UTF can use tags to indicate configuration(s) of the handshake protocol (such as whether to use cryptography during the handshake). Other uses of the tags are possible.

A field 410 includes acked_pkt_no, which is the packet number that this initial packet is going to acknowledge. The acked_pkt_no is sent from the receiver to the sender. On the other hand, the largest_acked, which is further described below, indicates the largest acknowledged packet number that the sender receives from the receiver. That is, the largest_acked is transmitted from the sender to the receiver.

If the control bit o is set (e.g. has the Boolean value 1), then a field 412 indicates a length (such as in bytes) of a field 414 that includes the options. If the control bit e is set, then a field 416 indicates a length (such as in bytes) of a field 418 that includes the early data. If the control bit t is set, then a field 420 indicates the number of tags present in the payload. Any number of tags can be possible as long as the packet size remains less than or equal to the maximum packet size. FIG. 4 illustrates that two tags are present. However, a packet can include one or more than two tags when the t control bit is set. A field 422A indicates a length of a field 424A that includes the data of the first tag. The field 424A includes the data of the first tag. A field 422B indicates a length of a field 424B that includes the data of the second tag. The field 424B includes the data of the second tag.

Figure 5:
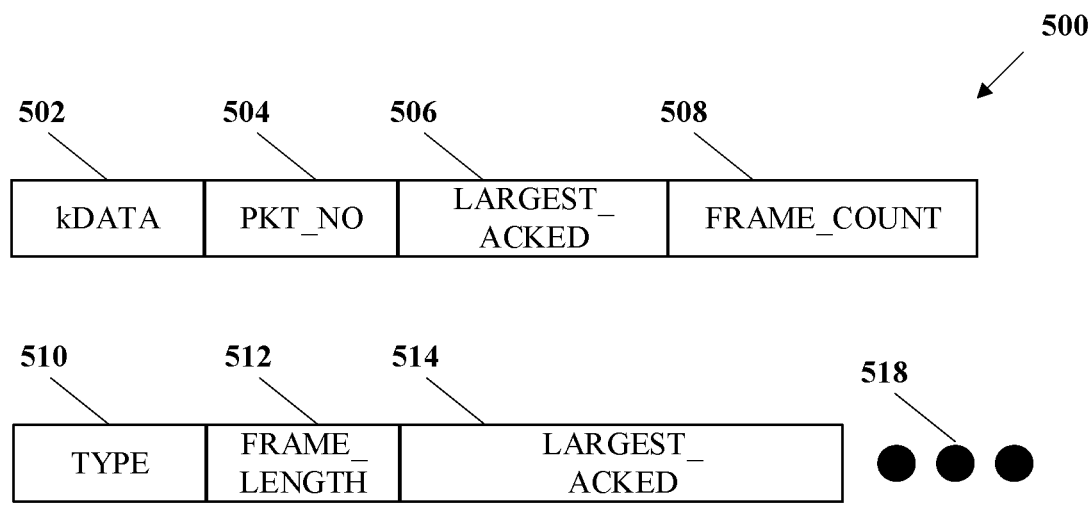
FIG. 5 is a diagram of an example of a structure of a data packet.

FIG. 5 is a diagram of an example of a structure 500 of a data packet. Other data packet structures of a UTF are also possible. The structure 500 further describes the structure of a packet according to FIG. 3 where the type is kData. A data packet can encapsulate different types and number of frames. Each data packet can contain one or more frames.

A field 502 indicates that the value of the packet type is kData. A field 504 can be the same as the field 304 of FIG. 3. A field 506 includes the largest packet number that was acknowledged by the receiver. Said another way, the field 506 includes the value largest_acked, which is the value of the largest acknowledged packet number received from the receiver. The largest acknowledged packet number received from the receiver can be determined based on an acknowledgement frame received from the receiver. Every stream packet received by the receiver includes the largest_acked packet number. The largest_acked can be used by the sender to indicate to the receiver the maximum packet number for which the sender received an acknowledgement from the receiver. Including the largest_acked packet number in a packet is referred to as the ack-ack mechanism (i.e., an acknowledgment of the acknowledgement). The ack-ack mechanism can be implemented by the acknowledgment manager module 222.

The ack-ack mechanism can solve the incorrect retransmission due to feedback link failure, such as packet loss, network jitter, network congestion, or other link failures. At the sender, the ack-ack mechanism can transfer the largest acknowledged sequence at present embedded into any data packet that is sent from the sender to the receiver. Responsive to receiving the largest_ack sequence from the sender, the receiver can carry the distribution information between the current ack sequence and the largest ack sequence into an acknowledgement packet that the receiver transmits back to the sender. The sender can then update the largest_ack sequence and verify the un-acknowledged packets to avoid incorrect retransmission. The ack-ack mechanism can take effect dynamically and adaptively based on the different network conditions. That is, the ack-ack mechanism can be dynamically enabled and disabled depending on the network conditions. If the network conditions are good (e.g., not degraded, etc.) and ack frames are not lost (i.e., are received by the sender), then there would be no need to enable the ack-ack mechanism. Enabling the ack-ack mechanism, when not necessary, results in a waste of bytes. The ack-ack mechanism can be enabled automatically if the sender or the receiver detects that the acknowledgement feedback link is degraded or that many acknowledgement packets are being lost.

In an implementation, the receiver can use the largest_acked packet number to continue to send (and resend) acknowledgments of packets received but for which the sender has not yet received acknowledgements. Additionally, the receiver can use the largest_acked packet number to stop including packet numbers smaller or equal to largest_acked packet number if future acknowledgment frames.

To illustrate, the sender transmitted packets having packet numbers (packet_no's) 1 to 100 and the receiver received the packets numbered 1-70, 75-90, 93-96. The receiver transmits, to the sender, acknowledgement frames for all the received packets. The acknowledgement frames can be as described with respect to FIG. 8. However, some of the transmitted acknowledgement frames may not arrive at the sender. Assume that the sender received acknowledgment frames for the packets numbered 1-70 and 76-78. As such, the sender determines that the largest_acked packet number is, for example, 78. In the case of a reliable stream, the sender can continue to transmit the packets numbered 71-75 until they are acknowledged. In the case of an unreliable stream, the sender does not retransmit the packets numbered 71-75. In another example, the UTF can retransmit the packets numbered 71-75 of an unreliable stream (or a partially reliable stream) a predetermined number of times (e.g., 2, 3, 5, or some other number of times). The receiver stops including acknowledgments of packet numbers smaller or equal to the largest_ack. Additionally, and further described below, in this scenario, a field 810 (i.e., the largest_observed_packet_number) of an acknowledgment frame, as described with respect to FIG. 8, would include the value 96. As becomes apparent with respect to FIG. 8, the sender can use the packet numbers of the gaps in an acknowledgment frame to determine which packets to retransmit. As mentioned above, in an example, whether to retransmit a frame is determined by the application layer based on the application needs.

Continuing the above example, the receiver may then receive data packets that include largest_acked=79. Responsive to receiving a packet that includes largest_acked=79, the receiver continues to send acknowledgement frames for the packets 80-90 and 93-96 even though the receiver had already sent such acknowledgements. As further described with respect to FIG. 8, ranges of packet numbers can be acknowledged.

A field 508 indicates the number of frames included in the data packet. For each of the frames, a respective type field (such as a field 510), a respective frame length field (such as a field 512), and a respective frame data field (such as a field 514) are included in the packet. Ellipsis 518 indicates that the fields 510-514 can be repeated based on the number of frames included in the data packet (i.e., the value of the field 508). Many frames can be included in the packet as long as the total size of the packet remains less than or equal to the maximum packet size and as allowed by the congestion control manager 224.

A frame can be a stream frame (i.e., kStream type value), an acknowledgement frame (i.e., kAckFrame type value), a close frame (i.e., kClose type value), or a congestion feedback frame (i.e., kFeedback type value). Other frame types are also possible. A stream of a stream frame is described with respect to FIG. 7. A structure of an acknowledgement frame is described with respect to FIG. 8. A structure of a close frame is described with respect to FIG. 9. A structure of a congestion feedback frame is described with respect to FIG. 10.

Figure 6:
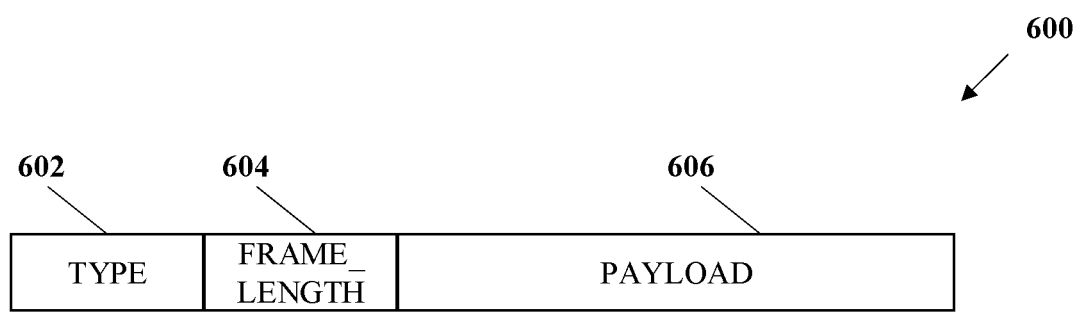
FIG. 6 is a diagram of an example of a structure of a frame.

FIG. 6 is a diagram of an example of a structure of a frame. Other frame structures of the UTF are also possible. A frame can be constructed by the session management module 208 of the UTF, such as by the stream manager module 214 of FIG. 2 or can be constructed by a module of the connection management module 210. Frames constructed by the stream manager module 214 are passed to the connection management module 210, as shown by the arrow 226. The packet manager module 218 of the connection management module 210 can include the frame, or can combine multiple frames, into a packet for transmission over the network 206, as indicated by a send/receive arrow 234. With respect to a received packet, and as already described, the packet manager module 218 can extract the frames included in the received packet and pass at least some of the frames to the session management module 208.

A field 602 can be used to indicate a type of the frame. The type can be used by a receiver to determine the semantics of the rest (e.g., the remaining content) of the frame. Many different frame types are possible. For example, the frame types can include a stream frame type (where the field 602 can have a constant value of kStream), an acknowledgment frame type (where the field 602 can have a constant value of kAckFrame), a close frame type (where the field 602 can have a constant value of kClose), and a congestion feedback frame type (where the field 602 can have a constant value of kFeedback).

Fields 604 and 606 can be as described with respect to fields 512 and 514 of FIG. FIG. 5. As further described with respect to FIGS. 7-10, the field 606 can include different payload data and data structures and have different semantics depending on the frame type value (i.e., the value of the field 602). A frame cannot be larger than a maximum frame size.

Figure 7:
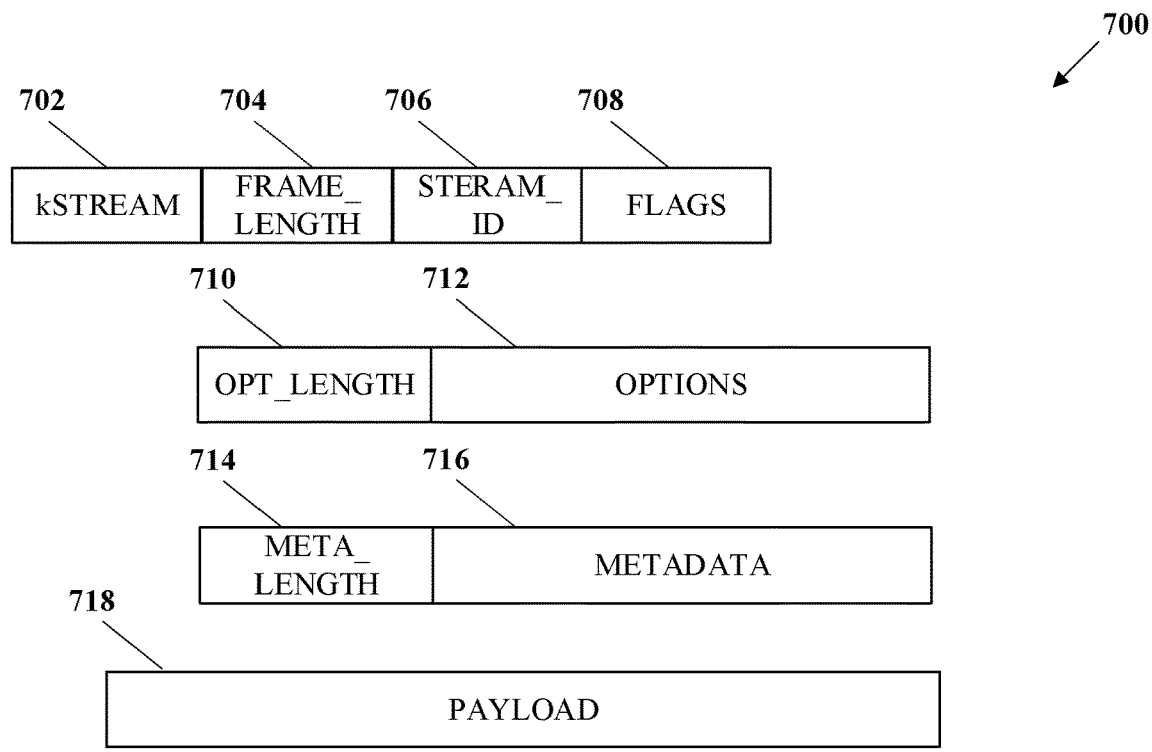
FIG. 7 is a diagram of an example of a structure of stream frame.

FIG. 7 is a diagram of an example of a structure 700 of stream frame. Other stream frame structures of a UTF are also possible. The structure 700 further describes the structure of a frame according to FIG. 6 where the frame type is kStream. A stream frame is a frame that contains application data. That is, a stream frame can be used for transferring application data to a receiver. A stream frame can optionally include option data or metadata.

In a stream frame, the value of the type field (i.e., a field 702) is the constant value kStream. A field 704 indicates the length (such as in bytes) of the stream frame. A field 706 can be used to indicate the unique identifier of a stream in a current connection that generated the stream frame. A field 708 can include two flags (e.g., bits): an options flag (o) and a metadata flag (m). The options flag (o) can be used to indicate whether the stream frame includes options data.

That is, when the options flag (o) is set (e.g., has the Boolean value 1), options-related fields (i.e., a field 710 and a field 712) are included in the stream frame. The metadata flag (m) can be used to indicate whether the stream frame includes metadata. That is, when the metadata flag (m) is set, metadata-related fields (i.e., a field 714 and a field 716) are included in the stream frame.

When the options flag (o) is set, the field 710 includes the size of the field 712, which includes the option data. When the metadata flag (m) is set, the field 714 includes the size of the field 716, which includes the metadata. A field 718 includes the stream payload. The size of the field 718 can be calculated by the receiver as (frame_length−opt_len−meta_len).

Figure 8:
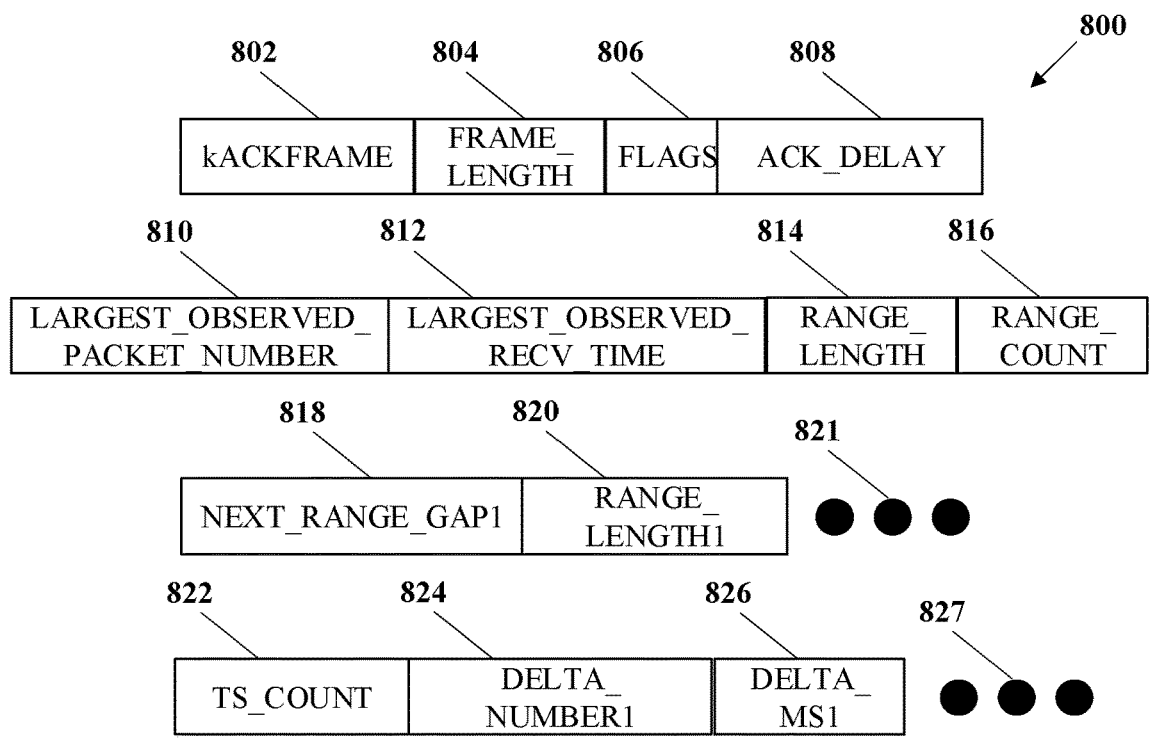
FIG. 8 is a diagram of an example of a structure of an acknowledgement frame.

FIG. 8 is a diagram of an example of a structure 800 of an acknowledgement frame. Other acknowledgement frame structures of the UTF are also possible. The structure 800 further describes the structure of a frame according to FIG. 6 where the frame type is kAckFrame. An acknowledgement frame is a frame that a receiver (e.g., the acknowledgment manager module 222 of the receiver) constructs and transmits to a sender to inform the sender of the packets received by the receiver. The receiver can acknowledge ranges of packets. There can be multiple ranges in an acknowledgement frame with gaps (such as for packets sent but not received) in the ranges. As already mentioned, the receiver can stop including in acknowledgement frames acknowledgements of packet numbers smaller or equal to largest_ack.

Acknowledgement frames according to this disclosure enable a sender to obtain feedback from the receiver about received packets. The obtained information can be used by the sender to optimize the transmission of packets based on the feedback from the receiver. For example, the received timestamps and the received range distribution can be used by the sender to separately analyze the uplink and the downlink performances to determine an optimal strategy for packet transmission. To illustrate, in an example, the congestion control manager 224 of the sender can use the data included in acknowledgement frame to compute an estimated bandwidth of the receiver or of the sender or both; the congestion control manager 224 can further use the received timestamps in the acknowledgement frame to calculate jitter (such as the jitter of the uplink, the jitter of the downlink, or both). The uplink refers to the network link that the sender uses to transmit packets to the receiver. The downlink means the network link that the acknowledgment frame is received on or, equivalently, the link that the receiver uses to transmit the acknowledgment frame.

The uplink performance can be determined by the sender based on uplink statistics that the sender maintains correlated with the obtained feedback. The obtained feedback enables the decoupling of analyses of the uplink status (e.g., performance, etc.) from the downlink status (e.g., performance, etc.). As such, the transmission quality can be evaluated more precisely by the connection management module 210 of the sender. The difference between sending rate and receiving rate can be calculated using packet-train-based probe techniques.

By decoupling the status of the uplink from that of the downlink, it is possible to determine (e.g., infer, etc.), for example, whether an unacknowledged packet is lost due to uplink performance issues and, therefore, the packet is to be retransmitted; or whether the packet was unacknowledged because the acknowledgment frame was lost due to downlink performance issues and, therefore, the packet is not to be retransmitted therewith preserving network bandwidth that would otherwise be wasted if the packet were to be retransmitted.

The feedback information included in an acknowledgment frame can include the received timestamps of every packet and the distribution information of ranges of the received packet numbers. For example, as FIG. 8 illustrates, the largest packet received timestamp and largest packet number received are recorded. The others are carried as delta values relative to the largest packet received time and number, described in a specific packet format example.

In an acknowledgement frame, the value of the type field (i.e., a field 802) is the constant value kAckFrame. A field 804 indicates the length (such as in bytes) of the acknowledgement frame. A bit 806 indicates whether the acknowledgement frame includes packet received timestamps (i.e., a field 822 and one or more fields 824).

A field 808 indicates the delay time (ack_delay) in acknowledging the largest observed (e.g., received) packet number. That is, the delay time can be the time difference (such as in milliseconds) between a first time that the receiver received the packet with the largest packet number indicated in the largest_acked field and a second time at which the receiver sends the instant acknowledgment frame.

A field 810 includes the value of the largest packet number of the packets received by the receiver (i.e., the value largest_observed_packet_number). A field 812 includes the timestamp that the largest observed packet number is received by the receiver (i.e., largest_observed_recv_time), such as by the packet manager module 218 of the receiver. To illustrate, the receiver may have received the packets numbered 10-49, 56-72, and 74. The largest_observed_packet_number would be 74.

A field 814 includes the length of the range information in the acknowledgement frame. A field 816 includes a count of the number of ranges included in the acknowledgement frame. A range can be described using two fields, such as fields 818 and 820. The field 818 can indicate the gap in packet number from last range to current range (i.e., next_range_gap). The field 820 can indicate the length of a current range (i.e., range_length). To illustrate, assume that the sender transmitted packets numbered 50-100 but that the receiver did not receive packets 60-72, 79-83, and 95-100. As such, the largest_observed_packet_number is 94; next_range_gap1 can be 11 (i.e., 94-83); range_length1 can be 5 (i.e., 83–79+1); next_range_gap2 can be 7 (i.e., 79-72); and range_length2 can be 13 (i.e., 72-60+1). The fields 818-820 can be repeated, as indicated by ellipsis 821 based on the count of the number of ranges (i.e., the value of the field 814).

A field 822 includes the count of timestamps included in the acknowledgement frame. A field 824 includes a delta (e.g., a difference) from the value largest_observed_packet_number (i.e., the value of the field 810) to a current packet number. To illustrate, assume that the largest_observed_packet_number is 100 and that arrival timestamps of only packet numbers 80 and 70 are to be included in the acknowledgement frame and that packets 71-79 are lost. As such, the field 822 can have a value of 2; the value delta_number1 (i.e., a first field 824) can be 20 (i.e., 100-80) and the value delta_number2 (i.e., a second field 824) can be 30 (i.e., 100-70). A field 826 includes, for the corresponding field 824, the respective delta from the value largest_observed_recv_time (i.e., the value of the field 812) to a received time of the current packet. The fields 824-826 can be repeated, as indicated by an ellipsis 827, based on the count of packet received timestamps (i.e., a value of the field 822).

In another example, the value of a first field 824 (e.g., delta_number4) (not shown) can be a delta from an immediately preceding value of a second field 824 (e.g., delta_number3) (not shown) where the delta_number1 can be the offset from the largest_observed_packet_number. To illustrate and using the above example, the field 822 can have a value of 2; the value delta_number1 (i.e., a first field 824) can be 20 (i.e., 100-80=20) and the value delta_number2 (i.e., a second field 824) can be 10 (i.e., 80-70=10).

An acknowledgement frame can be transmitted in a packet that does not include stream frames. An acknowledgement frame can also be included in a data packet that includes other stream frames. Including the acknowledgement frame in data packet that includes other stream frames is referred to as acknowledgment piggybacking. If the size of a data packet (e.g., a packet of type kData) that includes stream frames (of other frames) is such that, by including the acknowledgement frame in the data packet, the size of the data packet would not exceed the maximum packet size, then the acknowledgement frame can be included in the data packet.

Acknowledgement piggybacking can efficiently decrease the data rate consumption of acknowledgement frames, especially when the network traffic is very heavy. Additionally, the specific packet format of acknowledgment frames, as described herein, can carry (e.g., include, etc.) useful information, such as packets received timestamps, the acknowledgement piggybacking mechanism, and the ack-ack mechanism, are implemented dynamically and adaptively based on the real-time network conditions to improve the ack performance in the various application scenarios. Acknowledgment piggybacking is illustrated with respect to FIG. 12.

Figure 9:
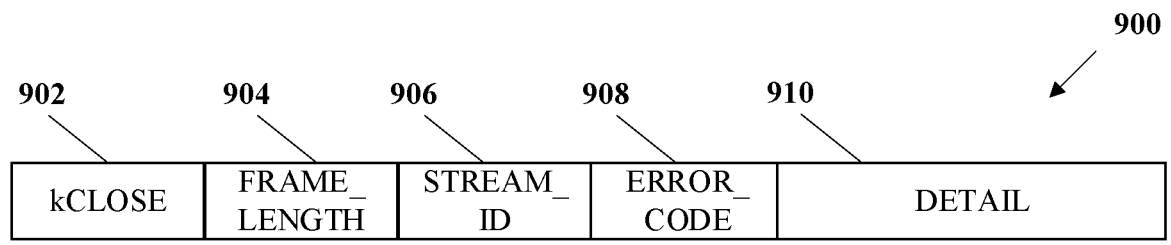
FIG. 9 is a diagram of an example of a structure of a close frame.

FIG. 9 is a diagram of an example of a structure 900 of a close frame. Other close frame structures of the UTF are also possible. The structure 900 further describes the structure of a frame according to FIG. 6 where the frame type is kClose. A close frame can be used to close a specific stream or the connection. Either side (i.e., a sender or a receiver) can send a close frame to the other. The close frame indicates that the sender of the close frame is about to perform a closing action.

In a close frame, the value of the type field (i.e., a field 902) is the constant value kClose. A field 904 indicates the length (such as in bytes) of the close frame. A field 906 indicates the identifier of the stream that is going to be closed by the sender of the close frame. The close frame can also be used to indicate that the connection (and all streams of the connection) are going to be closed. For example, a predefined value (e.g., 0xFFFF or some other value) for the field 906 can be used to indicate the closing of the connection.

A field 908 can indicate an error code for the closing action. That is, the field 908 can indicate a reason of the closing action. A field 910 can be used to provide more details regarding the reason(s) of the closing action.

In an example, a close frame may be sent from the sender to the receiver responsive to the sender not receiving acknowledgment frames, such as within a period of time, of a packet that the sender transmitted and that includes metadata. The sender can send a close frame to the receiver indicating that there is an uninitialized stream and which the sender is closing. The sender can further discard any cached stream frames of the uninitialized stream.

Figure 10:
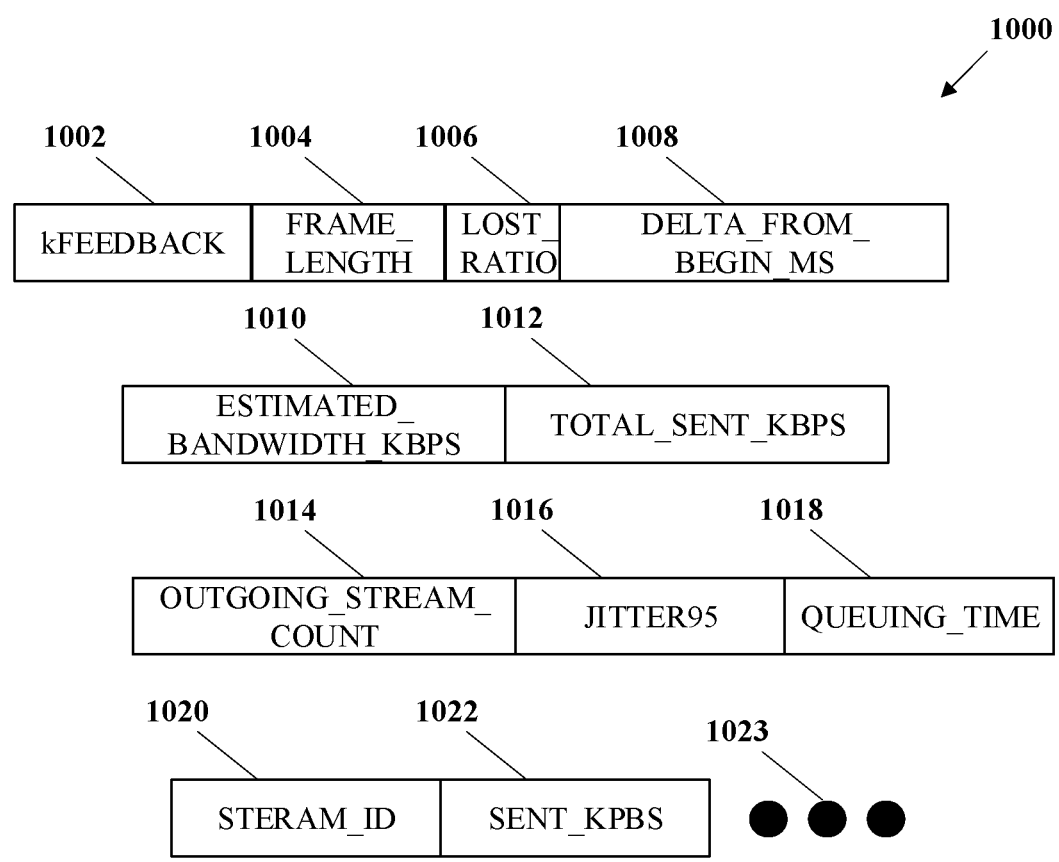
FIG. 10 is a diagram of an example of a structure of a feedback frame.

FIG. 10 is a diagram of an example of a structure 1000 of a feedback frame. Other feedback frame structures of the UTF are also possible. The structure 1000 further describes the structure of a frame according to FIG. 6 where the frame type is kFeedback.

Feedback frames (or congestion feedback frames) can be used to report network statistics to the peer side. That is, both the receiver and the sender can regularly send feedback frames to the each other. The feedback frames can be constructed based on network statistics that are collected by the side that transmits the feedback frame. The congestion control manager 224 of one side of the connection can gather network statistics, construct a feedback frame using the statistics. The feedback frame can be included in a packet and prioritized for transmission to the peer. The congestion control manager 224 of the peer can use feedback frames for congestion control.

In a feedback frame, the value of the type field (i.e., a field 1002) is the constant value kFeedback. A field 1004 indicates the length (such as in bytes) of the feedback frame. A field 1006 can indicate a loss ratio, which represents the ratio of the number of lost packets to the total number of sent packets. A field 1008 indicates delta_from_begin_ms, which can be the time between a current time (e.g., the time that the feedback frame was constructed by the receiver) and a time of creation of the connection. That is, the field 1008 can indicate the current duration (e.g., length, etc.) of the session. A field 1014 indicates the estimated bandwidth (such as in kilobits per second), which is an estimate of the amount of data that the uplink of sender of the feedback frame can transfer per unit of time (e.g., second). A field 1012 can indicate the total number of kilobits sent since the last feedback frame. A field 1014 indicates the number of streams for which the feedback frame includes statistics. A field 1016 indicates the packet jitter. Packet jitter can indicate a variation in the delay of received packets. For example, the sender may transmit a continuous stream of packets at evenly spaced intervals. However, due to several conditions (e.g., receiver network congestion, improper queuing, configuration errors, other conditions, or a combination thereof), the receiver may not receive the packets at the evenly spaced intervals; rather the delay between packets can vary instead of remaining constant. The field 1016 can indicate the jitter to within two standard deviations from the mean, which accounts for roughly 95% of a jitter data collected.

A field 1018 indicates the average queuing time of packets. For each of the streams, a respective field 1020 indicates the stream ID, followed by a respective field 1022 indicating the number of kilobits (or kilobytes) per second of data transmitted for the stream. For example, sent_kbpsN can indicate the bandwidth of the $N^{th}$ stream. Ellipsis 1023 indicate that there could be multiple fields 1020-1022.

In an example, at least some of the network statistics can be reported by the UTF to the application layer. The application may, for example, modify the application behavior based on the statistics. To illustrate, and without limitations, in the case of an RTC session, responsive to a determination of a degraded performance of the peer network (i.e., the downlink), the application may automatically increase the compression ratio (such as by increasing the quantization parameter (QP)), reduce the frame rate, temporarily turn off the video stream of the connection, adopt some other strategy, or a combination thereof.

As described with respect to FIG. 6, a stream frame can include metadata. Metadata can be used to describe essential characteristics of the stream. As such, the metadata must be guaranteed to transmit successfully even in unreliable streams. For example, a video application may use metadata to carry private video descriptors. Videos may not be decoded correctly without it.

Figure 11:
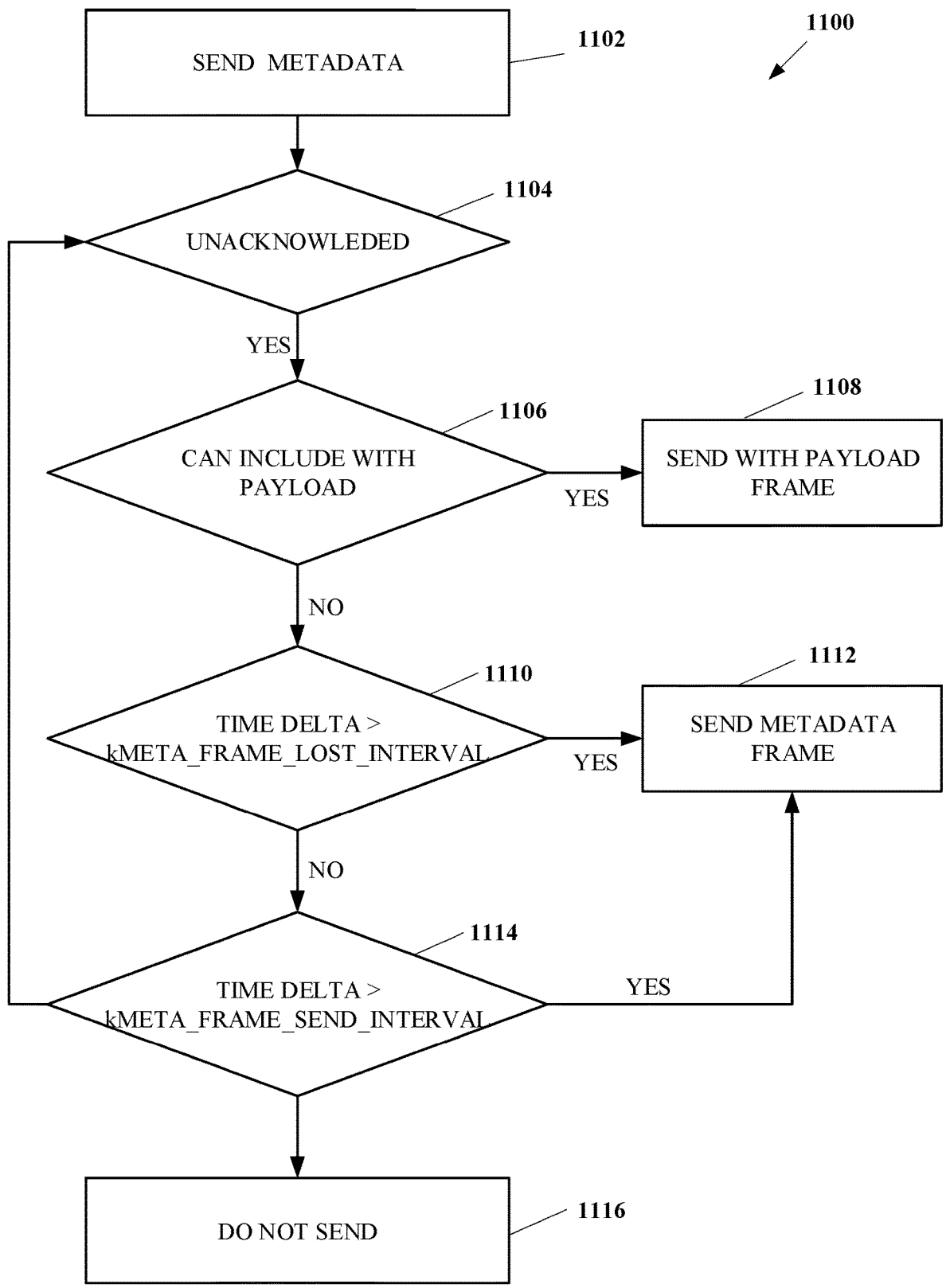
FIG. 11 is a diagram of a flowchart of an example of a technique for transmitting metadata.

FIG. 11 is a diagram of a flowchart of an example of a technique 1100 for transmitting metadata. The technique 1100 can be implemented by one or more module of a universal transport framework, such as the UTF 202 of FIG. 2. The technique 1100 can be implemented by a sender, such as an application of an apparatus that transmits stream data to a receiver. The technique 1100 can be implemented, for example, as a software program that may be executed by an apparatus, the apparatus 102 or the apparatus 104 of FIG. 1. The software program can include machine-readable instructions that may be stored in a memory such as the memory 110 or the memory 118 of FIG. 2, and that, when executed by a processor, such as the processor 108 or the processor 116 of FIG. 1, may cause the respective apparatus to perform the technique 1100. The technique 1100 may be implemented in whole or in part by the stream manager module 214 of FIG. 2. The technique 1100 can be implemented using specialized hardware or firmware. Multiple processors, memories, or both, may be used.

The technique 1100 implements a reliable, guaranteed mechanism to transmit metadata in unreliable streams. A stream identifier or a stream descriptor can be an example of metadata. To illustrate, in an RTC session, multiple users (more specifically, multiple RTC applications executing on respective user devices) may be connected to a server using respective UTFs. The server may send the video streams from of each user to all the users. At connection establishing time, the server (i.e., an RTC application therein) can send stream descriptor information (i.e., metadata) identifying the user (e.g., a user name, a user location, etc.) to each of the users so that each video stream received can be associated/identified by user. Other metadata are possible.

The technique 1100 can include metadata in stream frames responsive to the metadata fitting in the stream frames, such as a stream frame as described with respect to FIG. 7. To reduce the number of frames to be sent over a network, metadata can be included in a stream frame responsive to the stream frame including sufficient remaining space to carry the metadata. The metadata can be aggregated with that application data (e.g., the payload) in the stream frame (i.e., a kStream frame). When there is no sufficient space for the metadata, the metadata can be transmitted in a stand-alone metadata frame. A metadata frame is a kStream frame (i.e., a stream frame) that does not include a payload.

The technique 1100 additionally implements a redundant transmission mechanism such that the same metadata frame can be sent multiple times. Redundant transmission can be used to mitigate potential loss of the metadata over a degraded downlink of the receiver and can improve the chances of successful transmission from the sender (and receipt by the receiver) of the metadata frame. The metadata is retransmitted until the sender receives an acknowledgment frame of the metadata.

The receiver can cache the application data from an unreliable stream until the metadata, if any, is received successfully. Caching the application data can ensure that the application data of an unreliable stream will not be blocked from being sent due to the loss of metadata stream. That is, whereas some traditional techniques may first transmit the metadata (i.e., metadata frames) before transmitting application data, the UTF can send the metadata in stream (e.g., application) frames. Transmitting the metadata with application data ensures that application data can be immediately available for use at the receiver when the metadata is received. Additionally, packets including metadata may be lost while subsequent packets including application data are received at the receiver. The receiver can cache the application data until the metadata is received. To illustrate, in RTC session, the application data may be video or audio data. As such, the receiver can cache application data received with the metadata or received before the metadata so that as soon as the metadata is received the cached video and audio data can be processed at the receiver.

The technique 1100 can determine that metadata is to be transmitted to the receiver. For example, the stream factory 212 of the receiver may receive a request to transmit metadata with a request to establish (e.g., create, initialize, etc.) a stream. In an example, the metadata may be included in a request to the stream manager module 214. As such, if a stream has metadata, the UTF may not process the user data until the metadata is received. That is, when the application receives the application layer data of a stream from the session management module 208 of the UTF, the application receives the application and the metadata, if any. To reiterate, the protocol mechanism described herein can be used in an unreliable stream to ensure the reliable transmission of stream-level metadata and to deliver the metadata to the application layer before the data stream. Furthermore, delays that may be caused by traditionally transmitting metadata first followed by stream data can be avoided by piggybacking the metadata with the application data.

At 1102, the technique 1100 can transmit the metadata to the receiver. In an example, the metadata can be transmitted in a metadata frame or in a stream frame with application data, as further described below with respect to 1106. For example, the stream manager module 214 of the receiver can receive a request to transmit application data to the receiver and the stream manager module 214 can determine whether the metadata can be included in a stream frame with the application data.

At 1104, the stream manager module 214 determines whether an acknowledgement has been received for the metadata. The acknowledgment can be received in a frame of type kAckFrame, as described with respect to FIG. 8. That the metadata is acknowledged can mean that the sender receives an acknowledgement of a packet that includes the metadata. The technique 1100 terminates if the acknowledgement has been received. If the acknowledgement has not been received, the technique 1100 proceeds to 1106.

At 1106, the stream manager module 214 determines whether the metadata can be included in a stream frame for transmitting application data. As mentioned above, a stream frame cannot have a size that is larger than the maximum frame size. As such, the stream manager module 214 can determine whether the metadata can be included (e.g., fit, etc.) in the stream frame that carrying the application data. If the metadata can be included in the stream frame, then the technique 1100 proceeds to 1108 to construct a stream frame that includes the application data and the metadata. The stream frame can be passed to the connection management module 210, as indicated by the arrow 226 of FIG. 2, for transmission to the receiver. If the metadata cannot be included in the stream frame, the technique 1100 proceeds to 1110.

At 1110, the technique 1100 determines whether a time delta (i.e., the time difference between a current time and a last time of transmission of the metadata) is greater than a maximum threshold time, kMeta_Frame_Lost_Interval. In an example, the step 1110 can be performed by the stream itself. If the time delta is greater than the maximum threshold time (kMeta_Frame_Lost_Interval), the technique 1100 proceeds to 1112 to promptly transmit a metadata frame that includes the metadata. The maximum threshold time can be the maximum time within which an acknowledgement frame is expected to be received from the receiver. In an example, the constant time can be fixed. In an example, the constant time can be adjusted based on any received feedback frames. If the maximum threshold time has not elapsed since the metadata was last transmitted, then the technique 1100 proceeds to 1114.

At 1114, the technique 1000 waits for a minimum threshold time (kMeta_Frame_Send_Interval) before retransmitting the metadata in a metadata frame. By waiting the minimum threshold time, the technique 1100 can avoid retransmitting the metadata too frequently. The minimum threshold time threshold time can be constant or can be adjusted by the congestion control manager 224 based on feedback frames received from the receiver. In an example, the step 1114 can be performed by the stream itself.

While not specifically shown in FIG. 11, if a number of retransmissions (e.g., 4, 5, 10, or some other number of retransmissions) of the metadata has not been reached, then the technique 1100 proceeds back to 1104. If the number of retransmissions has been reached, then the technique 1100 proceeds to 1116. If the metadata is not acknowledged after the number of retransmissions, the technique 1100 may infer that, for whatever reason (e.g., the receiver is not available, network outage, etc.), an acknowledgement of the metadata will not be received or that the metadata will not be received. As such, the technique 1100 can cancel the transmission of the metadata and terminate the session. Terminating the session can include transmitting a close frame, which can be as described with respect to FIG. 9.

Figure 12:
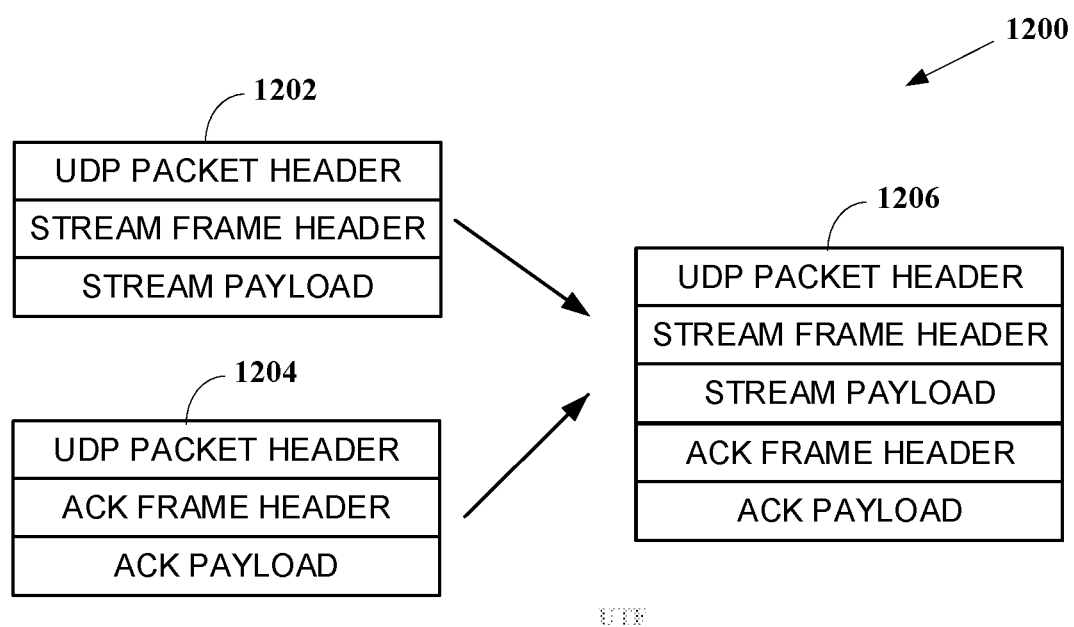
FIG. 12 is a diagram of an example of acknowledgment piggybacking.

FIG. 12 is a diagram of an example of acknowledgment piggybacking 1200. The Acknowledgment piggybacking 1200 illustrates a stream packet 1202, an acknowledgment packet 1204, and a piggybacking packet 1206.

The stream packet 1202 includes a UDP packet header, a stream frame header, and a stream payload. In the case of an RTC session, the stream frame header and the stream payload can be, respectively, media frame header and media payload. The acknowledgment packet 1204 includes a UDP packet header, an acknowledgement frame header, and acknowledgement payload. The acknowledgement frame header and acknowledgement payload can be as described with respect to the acknowledgement frame of FIG. 8. As such, each of the stream packet 1202 and the acknowledgment packet 1204 includes its own UDP packet header, if these packets were to be transmitted separately.

Contrastingly, the piggybacking packet 1206 includes only one UDP header and includes the media frame header and media payload of the stream packet 1202 and the acknowledgement frame header and the acknowledgement payload of the acknowledgment packet 1204. As such, the data rate consumption of acknowledgement packet in the network can be reduced.

In an example, the piggybacking mechanism can be enabled adaptively such as based on current network conditions. For example, in a bi-directional video communication session, when a network congestion occurs in the downlink direction, as detected by the congestion control manager 224 of the sender, the piggybacking mechanism can be enabled automatically in that direction (e.g., from the sender to the receiver). In an example, a delayed acknowledgement mechanism (such as the TCP delayed acknowledgement mechanism, or some other delayed acknowledgement mechanism) can be configured and adjusted dynamically.

FIG. 13 is an example of a program listing 1300 of using a universal transport framework for heterogeneous data streams. The program listing 1300 can be the source code of an application executing on an apparatus, such as one the apparatus 102 or the apparatus 104 of FIG. 1 or the user device 204 of FIG. 2.

Line 2 illustrates an API call to the stream factory 212 of FIG. 2. Line 4 illustrates an API call that configures the UTF to use UDP as the underlying network protocol for communication. Lines 10-11 illustrate an API call (e.g., a request, etc.) to the stream factory 212 to create a reliable stream and to set metadata for the stream, which is to be transmitted to the receiver. For illustrative purposes, the metadata is a simple string (i.e., "this is my metadata" as shown in line 11). However, the disclosure is not so limited and the metadata can be of any type that may be serialized for transmission to the receiver. Line 13 illustrates an API call to the stream manager module 214 to transmit application data (i.e., "application payload to send"). The application data can be any type of data. Line 13 also illustrates that the application can set a priority (i.e., "HighestPriority") for the application data. The priority can be used by the scheduler module 216 to determine when the application data is to be scheduled for transmission. Lines 15-17 illustrate a callback that the UTF can use for passing data received for the stream to the application.

Lines 20-21 illustrate another API call (e.g., a request, etc.) to the stream factory 212 to create an unreliable stream and to set metadata for the stream, which is to be transmitted to the receiver. For illustrative purposes, the metadata is a simple string (i.e., "this is my metadata" as shown in line 21). Line 23 illustrates an API call to the stream manager module 214 to transmit application data (i.e., "application payload to send"). The application data can be any type of data. Line 23 also illustrates that the application can set a priority (i.e., "LowestPriority") for the application data. Lines 25-27 illustrate a callback that the UTF can use for passing data received for the stream to the application.

Based on the foregoing, another aspect of the disclosed implementations is a set of operations that includes a first operations of a session management module of the transport framework and second operations of a connection management module of the transport framework. The set of operations can be stored in a memory (e.g., non-transitory computer-readable storage medium) as instructions executable by a processor.

The first operations can include operations to receive, from a sending application, data frames of a stream of a connection session for transmission to a receiver; transfer the data frames to the connection management module; and maintain respective statuses of the data frames. The second operations can include operations to receive an acknowledgment frame from the receiver, where the acknowledgment frame comprises a range of packet numbers and the range of packet numbers indicates that the receiver received packets having the packet numbers of the range of the packet numbers; and notify the session management module of frame numbers included in the packets having the packet numbers of the range. A respective status of a data frame of the data frames can be one of an inflight-status, an acknowledged-status, a lost-status, or a spurious-lost-status.

In an example, the first operations further include operations to receive a request to establish the stream, where the request can include whether the stream is a reliable stream, an unreliable stream, or a partially reliable stream. In an example, the second operations can include operations to notify, based on the acknowledgment frame, the session management module of data frames acknowledged by the receiver; and the first operations can include operations to update the respective statuses of at least some of the data frames based on the notifying.

In an example, the second operations can further include operations to receive a feedback frame from the receiver, where the feedback frame comprises a bandwidth of the stream and a duration of the connection session. In an example, the first operations can further include operations to notify the sending application of lost frames based on the acknowledgment frame. For example, in the case of a reliable stream or a partially reliable stream, the application may determine to retransmit the lost frame. As indicated above, in the case of an unreliable stream, the application can determine to retransmit a lost frame (at least for a predetermined number of times).

As described above, a person skilled in the art will note that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for communication between a receiving application executing at the apparatus and a sending application of a sending apparatus, comprising:
   a processor configured to:
      establish a stream for transmitting data between the sending application and the receiving application;
      transmit a first request to the sending application to transmit metadata to the receiving application, wherein the metadata are associated with the stream and are descriptive of an application data transmitted over the stream;
      transmit a second request to the sending application to transmit the application data to the receiving application;
      receive a first frame from the sending application, wherein the first frame is generated, by the sending application, to include the application data and the metadata based on a determination that the metadata and the application data do not exceed a maximum frame size, and the metadata is included in a second frame based on a determination that that the metadata and the application data exceed the maximum frame size; and
      process the application data from the first frame in response to a determination that the metadata has been received and processed, wherein the application data from the first frame is not processed until the metadata associated with the stream is received, wherein the application data is cached by the receiving application until the metadata associated with the stream is received and processed.

2. The apparatus of claim 1, wherein the first frame and the second frame are received using an unreliable transport protocol.

3. The apparatus of claim 1, wherein the processor is further configured to:
receive, from the sending application, a metadata frame after a threshold time since receiving the first frame, wherein the metadata frame is received in response to a determination that the metadata of the is lost during transmission.

4. The apparatus of claim 1, wherein the processor is further configured to:
receive, from the sending application, a metadata frame the includes the metadata, wherein the metadata frame is received responsive to a determination, by the sending application, that no acknowledgment of the metadata has been received from the receiving application and a time difference between a current time and a time of transmission of the first frame not exceeds a threshold time.

5. The apparatus of claim 1, wherein the sending application retransmits the metadata up to a threshold number of times, responsive to a determination that no acknowledgment of the metadata has been received from the receiving application.

6. The apparatus of claim 5, wherein the stream is closed by the sending application responsive to a determination that no acknowledgment of the metadata has been received after the threshold number of retransmissions.

7. A method for communication between a receiving application executing at a receiving apparatus and a sending application of a sending apparatus, comprising:
establishing a stream for transmitting data between the sending application and the receiving application, wherein the stream is used to transmit media data;
transmitting, to a session manager module of the sending apparatus, a first request to transmit metadata to the receiving application, wherein the metadata are associated with the stream and are descriptive of data transmitted over the stream;
transmitting, to the session manager module, a second request to transmit application data to the receiving application;
receiving, at the receiving application, a frame from a connection management module of the sending application, wherein the frame is generated, by the sending application, to include the application data and the metadata based on a determination that the metadata and the application data do not exceed a maximum frame size; and
processing, by the receiving application, the application data in response to a determination that the metadata has been received and processed, wherein the application data from the frame is not processed until the metadata associated with the stream is received, wherein the application data is cached by the receiving application until the metadata associated with the stream is received and processed.

8. The method of claim 7, wherein a second frame includes the metadata based on a determination that the application data and the metadata are of such respective sizes that the application data and the metadata exceed a maximum frame size.

9. The method of claim 7, wherein the frame is received using an unreliable transport protocol.

10. The method of claim 7, further comprising:
receiving, from the connection management module, metadata frame that includes the metadata, wherein the metadata frame is received responsive to a determination, by the connection management module, that no acknowledgement of the metadata has been received from the receiving application within a threshold time since transmitting the frame.

11. The method of claim 7, further comprising:
receiving, from the connection management module, a metadata frame that includes the metadata, responsive to a determination, by the connection management module, that no acknowledgment of the metadata has been received from the receiving application and a time difference between a current time and a time of transmission of the frame exceeds a threshold time.

12. The method of claim 7, wherein the connection management module retransmits the metadata up to a threshold number of times, responsive to receiving no acknowledgment of the metadata from the receiving application.

13. The method of claim 12, wherein the connection management module closes the stream responsive to a determination that no acknowledgment of the metadata has been received, from the receiving application, after the threshold number of retransmissions.

14. A non-transitory computer-readable storage medium that includes executable instructions that, when executed by a processor, perform operations of a transport framework for communication between a sending application of a sending apparatus and a receiving application of a receiving apparatus, the operations comprising:
establishing, through a session manager module of the transport framework, a stream for transmitting data between the sending application and the receiving application;
transmitting to the session manager module a first request to transmit metadata to the receiving application, wherein the metadata are associated with the stream and are descriptive of data transmitted over the stream;
transmitting to the session manager module a second request to transmit application data to the receiving application;
receiving a first frame from a connection management module of the transport framework, wherein the first frame is generated, by the sending application, to include the application data and the metadata based on a determination that the metadata and the application data do not exceed a maximum frame size, and the metadata is included in a second frame based on a determination that that the metadata and the application data exceed the maximum frame size; and
processing the application data in response to a determination, by the receiving application, that the metadata has been received and processed, wherein the application data from the first frame is not processed until the metadata associated with the stream is received, wherein the application data is cached by the receiving application until the metadata associated with the stream is received and processed.

15. The non-transitory computer-readable storage medium of claim 14, wherein the first frame and the second frame are received using an unreliable transport protocol.

16. The non-transitory computer-readable storage medium of claim 14, wherein the operations further comprise:
receiving, from the connection management module, a metadata frame the includes the metadata, wherein the metadata frame is transmitted responsive to a determination, by the connection management module, that no acknowledgement of the metadata has been received from the receiving application with a threshold time since transmitting the first frame.

17. The non-transitory computer-readable storage medium of claim 14, wherein the operations further comprise:

receiving, from the connection management module, a metadata frame that includes the metadata, responsive to a determination, by the connection management module, that no acknowledgment of the metadata has been received from the receiving application and a time difference between a current time and a time of transmission of the first frame is not exceeding a threshold time.

18. The non-transitory computer-readable storage medium of claim 14, wherein the stream is closed, by the connection management module, responsive to receiving no acknowledgment of the metadata from the receiving apparatus after retransmitting the metadata to the receiving application a threshold number of times.

\* \* \* \* \*